US009626701B2

(12) United States Patent
Capps et al.

(10) Patent No.: US 9,626,701 B2
(45) Date of Patent: Apr. 18, 2017

(54) SYSTEM AND METHOD FOR FACILITATING CASH PAYMENT TRANSACTIONS USING A MOBILE DEVICE

(75) Inventors: Stephen P. Capps, San Carlos, CA (US); John Paul Minor, Brick, NJ (US); Catalin Voss, Mauer (DE)

(73) Assignee: PayNearMe, Inc., Mountain View, CA (US)

( * ) Notice: Subject to any disclaimer, the term of this patent is extended or adjusted under 35 U.S.C. 154(b) by 0 days.

(21) Appl. No.: 13/479,135

(22) Filed: May 23, 2012

(65) Prior Publication Data

US 2013/0317923 A1     Nov. 28, 2013

(51) Int. Cl.
*G06Q 20/00*     (2012.01)
*G06Q 30/06*     (2012.01)
(Continued)

(52) U.S. Cl.
CPC ............ *G06Q 30/06* (2013.01); *G06Q 20/00* (2013.01); *G06Q 20/12* (2013.01);
(Continued)

(58) Field of Classification Search
None
See application file for complete search history.

(56) References Cited

U.S. PATENT DOCUMENTS

| 4,799,156 A | 1/1989 | Shavit et al. |
| 5,056,019 A | 10/1991 | Schultz et al. |

(Continued)

FOREIGN PATENT DOCUMENTS

| EP | 1174811 | 1/2002 |
| EP | 2187349 | 5/2010 |

(Continued)

OTHER PUBLICATIONS

"PayNearMe at FinovateFall 2010" retrieved on Sep. 12, 2012 from http://www.youtube.com/watch?v=d-oaZpCzpqk (Oct. 4-5, 2010; posted Nov. 5, 2010; the Presenters are: CEO Danny Shader and named inventor John Minor; also found on Assignee's website of www.paynearme.com, retrieved from: http://liveweb.archive.org/http://www.paynearme.com/consumers).*

(Continued)

*Primary Examiner* — Peter L Ludwig
(74) *Attorney, Agent, or Firm* — Blakely, Sokoloff, Taylor & Zafman LLP

(57) ABSTRACT

Disclosed herein are systems and methods for facilitating transactions between a merchant-partner and an end-user. In one embodiment, a service provider: (a) stages a transaction between a merchant and a consumer; (b) creates a transaction-specific unique reference locator (URL) linked to a transaction-specific web page; and (c) sends the transaction-specific URL to the consumer's mobile device. Whereupon the consumer clicks on the transaction specific URL on their mobile device, the service provider displays a token ID on the transaction-specific web page. The token ID is linked to the staged transaction and is used to initiate data communication between a point-of-sale (POS) terminal and the service provider's processing unit. The service provider can then: receive confirmation that the consumer has presented the token ID and a payment to the POS terminal; display a transaction receipt on the transaction-specific web page; and/or notify the merchant that the consumer has provided the payment.

14 Claims, 20 Drawing Sheets

(51) Int. Cl.
 *G06Q 50/00* (2012.01)
 *G06Q 30/00* (2012.01)
 *G06Q 20/12* (2012.01)
 *G06Q 20/32* (2012.01)

(52) U.S. Cl.
 CPC ..... *G06Q 20/3223* (2013.01); *G06Q 20/3276* (2013.01); *G06Q 30/00* (2013.01); *G06Q 50/00* (2013.01)

(56) References Cited

U.S. PATENT DOCUMENTS

| | | |
|---|---|---|
| 5,308,119 A | 5/1994 | Roshkoff |
| 5,310,997 A | 5/1994 | Roach et al. |
| 5,336,870 A * | 8/1994 | Hughes et al. ............. 235/379 |
| 5,577,109 A | 11/1996 | Stimson et al. |
| 5,594,226 A | 1/1997 | Steger |
| 5,721,768 A | 2/1998 | Stimson et al. |
| 5,924,080 A | 7/1999 | Johnson |
| 5,956,694 A | 9/1999 | Powell |
| 5,970,470 A | 10/1999 | Walker et al. |
| 6,055,516 A | 4/2000 | Johnson et al. |
| 6,070,798 A | 6/2000 | Nethery |
| 6,141,653 A | 10/2000 | Conklin et al. |
| 6,185,545 B1 | 2/2001 | Resnick et al. |
| 6,260,024 B1 | 7/2001 | Shkedy |
| 6,266,647 B1 | 7/2001 | Fernandez |
| 6,356,878 B1 | 3/2002 | Walker et al. |
| 6,381,582 B1 | 4/2002 | Walker et al. |
| 6,450,407 B1 | 9/2002 | Freeman et al. |
| 6,581,827 B2 | 6/2003 | Welton |
| 6,736,314 B2 | 5/2004 | Cooper et al. |
| 6,745,022 B2 | 6/2004 | Knox |
| 6,837,426 B2 | 1/2005 | Tidball et al. |
| 6,938,013 B1 | 8/2005 | Gutierrez-Sheris |
| 6,971,574 B1 | 12/2005 | Herskowitz |
| 7,006,983 B1 | 2/2006 | Packes, Jr. et al. |
| 7,035,813 B1 | 4/2006 | Cook |
| 7,042,992 B1 | 5/2006 | Falcone |
| 7,243,839 B2 | 7/2007 | Beck et al. |
| 7,290,704 B1 | 11/2007 | Ball et al. |
| 7,293,109 B2 | 11/2007 | Ott |
| 7,296,003 B2 | 11/2007 | Mersky et al. |
| 7,344,067 B2 | 3/2008 | Beck et al. |
| 7,386,485 B1 | 6/2008 | Mussman et al. |
| 7,422,153 B2 | 9/2008 | Cai |
| 7,611,051 B1 | 11/2009 | Beck et al. |
| 7,640,193 B2 | 12/2009 | Crespo et al. |
| 7,711,639 B2 | 5/2010 | Reid et al. |
| 7,729,984 B1 | 6/2010 | Nappi |
| 7,783,571 B2 | 8/2010 | Fish et al. |
| 7,797,192 B2 | 9/2010 | Mitchell et al. |
| 7,904,385 B2 | 3/2011 | Bishop et al. |
| 7,949,600 B1 | 5/2011 | Portillo et al. |
| 8,060,382 B1 | 11/2011 | Lee et al. |
| 8,140,381 B1 | 3/2012 | Wu et al. |
| 8,282,001 B2 | 10/2012 | Snyder et al. |
| 8,371,502 B1 | 2/2013 | Galit et al. |
| 8,392,208 B1 | 3/2013 | Klieman et al. |
| 8,605,094 B1 | 12/2013 | Alfaro et al. |
| 8,651,374 B2 | 2/2014 | Brabson et al. |
| 8,681,741 B1 | 3/2014 | Ngo et al. |
| 2001/0032182 A1 | 10/2001 | Kumar et al. |
| 2001/0042042 A1 | 11/2001 | Stokes et al. |
| 2002/0002537 A1 | 1/2002 | Bastiansen |
| 2002/0010600 A1 | 1/2002 | Fujita |
| 2002/0013768 A1 | 1/2002 | Ganesan |
| 2002/0077978 A1 | 6/2002 | O'Leary et al. |
| 2002/0147689 A1 | 10/2002 | Falkner |
| 2002/0152163 A1 | 10/2002 | Bezos et al. |
| 2002/0153410 A1 | 10/2002 | Santini |
| 2002/0161644 A1 | 10/2002 | Duffield |
| 2002/0161721 A1 | 10/2002 | Yuan et al. |
| 2002/0188559 A1 | 12/2002 | Schultz |
| 2002/0195486 A1 | 12/2002 | Erb et al. |
| 2003/0046223 A1 | 3/2003 | Crawford et al. |
| 2003/0061162 A1 | 3/2003 | Matthews |
| 2003/0149632 A1 | 8/2003 | Walker et al. |
| 2003/0154165 A1 | 8/2003 | Horn et al. |
| 2003/0220862 A1 | 11/2003 | Kilgore et al. |
| 2004/0024701 A1 | 2/2004 | Hansen et al. |
| 2004/0024707 A1 | 2/2004 | Perre et al. |
| 2004/0030647 A1 | 2/2004 | Hansen et al. |
| 2004/0035922 A1 | 2/2004 | Cameron |
| 2004/0133515 A1 | 7/2004 | McCoy et al. |
| 2004/0139009 A1 | 7/2004 | Kozee et al. |
| 2004/0185869 A1 | 9/2004 | Lee et al. |
| 2004/0210476 A1 | 10/2004 | Blair et al. |
| 2004/0249705 A1 | 12/2004 | Spencer et al. |
| 2005/0108104 A1 | 5/2005 | Woo |
| 2005/0125345 A1 | 6/2005 | Miller et al. |
| 2005/0137970 A1 | 6/2005 | Houle et al. |
| 2005/0182684 A1 | 8/2005 | Dawson et al. |
| 2005/0256806 A1 | 11/2005 | Tien et al. |
| 2006/0054695 A1 | 3/2006 | Owada |
| 2006/0136301 A1 | 6/2006 | Grovit |
| 2006/0167791 A1 | 7/2006 | Hahn-Carlson |
| 2006/0173776 A1 * | 8/2006 | Shalley et al. ............. 705/39 |
| 2006/0253335 A1 | 11/2006 | Keena |
| 2007/0016523 A1 | 1/2007 | Blair et al. |
| 2007/0016526 A1 | 1/2007 | Hansen et al. |
| 2007/0022058 A1 | 1/2007 | Labrou et al. |
| 2007/0038516 A1 | 2/2007 | Apple et al. |
| 2007/0130028 A1 | 6/2007 | Provinse |
| 2007/0150411 A1 | 6/2007 | Addepalli et al. |
| 2007/0150414 A1 | 6/2007 | Templeton |
| 2007/0174082 A1 | 7/2007 | Singh |
| 2007/0225912 A1 | 9/2007 | Grush |
| 2007/0252696 A1 | 11/2007 | Belisle et al. |
| 2008/0021841 A1 | 1/2008 | Rau et al. |
| 2008/0040233 A1 * | 2/2008 | Wildman et al. ............. 705/26 |
| 2008/0097904 A1 | 4/2008 | Volchek et al. |
| 2008/0162345 A1 | 7/2008 | Passanha |
| 2008/0215475 A1 * | 9/2008 | Ramer et al. ............. 705/37 |
| 2008/0275811 A1 | 11/2008 | Koningstein et al. |
| 2008/0301047 A1 | 12/2008 | Fish et al. |
| 2008/0319869 A1 | 12/2008 | Carlson et al. |
| 2009/0012862 A1 | 1/2009 | Pirillo et al. |
| 2009/0017798 A1 | 1/2009 | Pop |
| 2009/0048886 A1 | 2/2009 | Bishop et al. |
| 2009/0055266 A1 | 2/2009 | Brody et al. |
| 2009/0112662 A1 | 4/2009 | Mullen et al. |
| 2009/0112760 A1 | 4/2009 | Johnson et al. |
| 2009/0150290 A1 | 6/2009 | Szrek et al. |
| 2009/0157566 A1 | 6/2009 | Grush |
| 2009/0187492 A1 * | 7/2009 | Hammad et al. ............. 705/26 |
| 2009/0204522 A1 | 8/2009 | Meyer |
| 2009/0222317 A1 | 9/2009 | Allen et al. |
| 2009/0228336 A1 | 9/2009 | Giordano et al. |
| 2009/0234746 A1 | 9/2009 | Jensen et al. |
| 2009/0240594 A1 | 9/2009 | Kerner et al. |
| 2009/0254381 A1 | 10/2009 | Frederickson et al. |
| 2009/0313109 A1 | 12/2009 | Bous et al. |
| 2009/0327133 A1 | 12/2009 | Aharoni et al. |
| 2010/0005025 A1 | 1/2010 | Kumar et al. |
| 2010/0017279 A1 | 1/2010 | Connor, Jr. |
| 2010/0138344 A1 | 6/2010 | Wong et al. |
| 2010/0145723 A1 * | 6/2010 | Hudson et al. ............. 705/2 |
| 2010/0174646 A1 | 7/2010 | Cole et al. |
| 2010/0191578 A1 * | 7/2010 | Tran et al. ............. 705/10 |
| 2010/0205167 A1 * | 8/2010 | Tunstall-Pedoe et al. ... 707/706 |
| 2010/0223182 A1 | 9/2010 | Battaglini |
| 2010/0257081 A1 | 10/2010 | Ritchie |
| 2010/0268821 A1 | 10/2010 | Pau et al. |
| 2010/0276484 A1 | 11/2010 | Banerjee et al. |
| 2010/0332265 A1 | 12/2010 | Smith |
| 2011/0125561 A1 | 5/2011 | Marcus |
| 2011/0131118 A1 | 6/2011 | Srinivasan et al. |
| 2011/0145145 A1 | 6/2011 | Battaglini et al. |
| 2011/0208550 A1 | 8/2011 | Lamarche et al. |
| 2011/0208641 A1 | 8/2011 | Shader et al. |
| 2011/0208642 A1 | 8/2011 | Shader et al. |
| 2011/0213699 A1 | 9/2011 | Johnson |
| 2011/0225067 A1 | 9/2011 | Dunwoody |

(56) References Cited

U.S. PATENT DOCUMENTS

| | | | |
|---|---|---|---|
| 2011/0238474 A1* | 9/2011 | Carr et al. | 705/14.23 |
| 2011/0258122 A1 | 10/2011 | Shader et al. | |
| 2011/0258686 A1 | 10/2011 | Raj et al. | |
| 2011/0276474 A1 | 11/2011 | Portillo et al. | |
| 2012/0005075 A1 | 1/2012 | Bulawa et al. | |
| 2012/0030110 A1 | 2/2012 | Prakash et al. | |
| 2012/0041877 A1 | 2/2012 | Rao | |
| 2012/0066081 A1 | 3/2012 | Shader et al. | |
| 2012/0072346 A1 | 3/2012 | Barkan Daynovsky et al. | |
| 2012/0084178 A1 | 4/2012 | Ehbauer et al. | |
| 2012/0129552 A1* | 5/2012 | Skybey | 455/456.3 |
| 2012/0130797 A1 | 5/2012 | Shin | |
| 2012/0166314 A1 | 6/2012 | Kimberg | |
| 2012/0179558 A1 | 7/2012 | Fischer | |
| 2012/0185317 A1 | 7/2012 | Wong | |
| 2012/0209767 A1 | 8/2012 | Battaglini et al. | |
| 2013/0006785 A1 | 1/2013 | Perkins et al. | |
| 2013/0030995 A1 | 1/2013 | O'Leary et al. | |
| 2013/0041741 A1 | 2/2013 | Shader et al. | |
| 2013/0046691 A1 | 2/2013 | Culton | |
| 2013/0080239 A1 | 3/2013 | Okerlund | |
| 2013/0124410 A1 | 5/2013 | Kay et al. | |
| 2013/0138563 A1 | 5/2013 | Gilder et al. | |
| 2013/0166398 A1 | 6/2013 | Minde | |
| 2014/0012688 A1 | 1/2014 | Mcguinness et al. | |
| 2014/0052654 A1 | 2/2014 | Curetti et al. | |
| 2014/0095481 A1 | 4/2014 | Argue et al. | |
| 2014/0108201 A1 | 4/2014 | Frechette et al. | |
| 2014/0122337 A1 | 5/2014 | Kang | |
| 2014/0279111 A1 | 9/2014 | Mahaffey et al. | |
| 2014/0279509 A1 | 9/2014 | Khilnani et al. | |

FOREIGN PATENT DOCUMENTS

| | | |
|---|---|---|
| GB | 2359652 | 2/2006 |
| JP | 2001-109835 | 4/2001 |
| JP | 2001/109835 | 4/2001 |
| JP | 2001-325468 | 11/2001 |
| JP | 2001/325468 | 11/2001 |
| KR | 10-2006-0125667 | 12/2006 |
| WO | WO-2008/018052 | 2/2008 |
| WO | WO-2010/040206 | 4/2010 |

OTHER PUBLICATIONS

Coggins, Wynn W. (2002). Prior Art in the Field of Business Method Patents—When is an Electronic Document a Printed Publication for Prior Art Purposes? Presented at AIPLA, Fall 2002; www.USPTO.gov.*
Plymouth, K. & Martin, J. (2009). Bill Payment Trends: Major Shifts in Consumer Behavior Require Comprehensive Planning. A First Data White Paper.*
Rao, L. (2010). PayNearMe Launches Cash Payment System With 7-Eleven; Signs Up Amazon, Facebook. Disrupt, TechCruch.*
"PayNearMe at Finovate 2010" retrieved on May 7, 2015 from https://www.youtube.com/watch?v=d-oaZpCzpqk (Oct. 4-5, 2010; posted Nov. 5, 2010; see arrow on screen referring to the publication date of this electronic reference, the publication date of Nov. 5, 2010 being a date more than one year prior to the filing of the instant application; the Prese.*
"Inside Redbox Mobile Demo" (Feb. 1, 2009), uploaded to YouTube by habdeira, retrieved on Sep. 12, 2012 from: http://www.youtube.com/watch?v=iroan2BtzDc (hereinafter "RedBox App").*
PayNearMe Demonstration http://www.paynearme.com/h_videos/greyhound-video which was accessible via a redirect from "http://www.paynearme.com/greyhound" as of Jul. 9, 2013, and uploaded to the www.paynearme.com website in Apr. 2012.
MODASolutions (2007)"A Look at How Online Bill Payment Changes the eCommerce Landscape" A MODASolutionsTM White Paper, pp. 1-14.
"Cash payment comes to internet retailing." Accessed at http://www.internetretailer.com/internet/marketing conference/56525-cash-payment-come. Jun. 18, 2009. (pp. 1-2).
"Amazon debuts Honor System." Accessed at http://news.cnet.com/2100-1017-252122.html. Feb. 6, 2001. (pp. 1-4).
"Amazon Payments Account Management." Accessed at https://payments.amazon.com/sdui/sdul/business? sn=devlps/marketplace. Jun. 18, 2009. (pp. 1-4).
White, Ron, "How Computers Work", Millennium Ed., Que Corporation, Indianapolis, IN, 1999.
"PCT Search Report and Written Opinion", PCT/US2013/041974, (Aug. 14, 2013), 11 pages.
Finovate Fall 2011 show of Sep. 20 & 21, 2011, https://www.youtube.com/watch?v=1YWrVuKlp8k; uploaded on YouTube on Oct. 28, 2011.
Finovate Spring 2011 show of May 10 & 11, 2011, https://www.youtube.com/watch?v=8nA9Vd_3aKo; uploaded on YouTube on Jun. 24, 2011.
PayNearMe Demonstration http://www.paynearme.com/h_videos/greyhound-video which was accessible via a redirect from http://www.paynearme.com/greyhound as of Jul. 9, 2013, and uploaded to the www.paynearme.com website in Apr. 2012.
PayNearMe Demonstration Video; http://www.paynearme.com/greyhound; Apr. 2012.
"PayNearMe at FinovateFall 2010" retrieved on Sep. 12, 2012 from http://www.youtube.com/watch?v=d-oaZpCzpqk (Oct. 4-5, 2010; posted Nov. 5, 2010; the Presenters are: CEO Danny Shader and Named inventor John Minor; also found on Assignee's website of www.paynearme.com, retrieved from: http://liveweb,archive.org/http://www.paynearme.com/consumers).
Coggins, Wynn W. (2002). Prior Art in the Field of Business Method Patents—When is an Electronic Document a Printed Publication for Prior Art Purposes? Presented at AIPLA, Fall 2002.
Credit Card Processing Blog (Aug. 12, 2010), How to Manage 'Non-Matching Account Number' Chargebacks (hereinafter "Credit Card Processing").
PayNearMe at FinovateFall 2010 (2010), uploaded to youtube.com on Nov. 5, 2010 (hereinafter PayNearMe2010).
Dealer Incentives, by Tim Gutowski, http://www.cars.com/go/advice/Story.jsp?section=inc&story=incDealer&subject=incent, verified by internet Archive WayBack Machine Apr. 27, 2005.
Channel Loyalty Program, htto://www.awards.co.za/what-we-do/sale-channel-incentive-programs/channel-loyalty-program/, Achievement Awards Group, verified by Internet Archive WayBack Machine May 12, 2013.
Dao et al. Location-Based services: technical and business issues. School of Surbeying and Spatial Information Systems, The University of New South Wales, Sydney, Australia, GPS Solutions (2002) 6: 169-178.

* cited by examiner

300

Create URL linked to transaction-specific web page.
301

Provide consumer with a prompt to enter their contact information.
Link contact information to staged transaction.
302

Send URL to the consumer.
303

Did consumer click on URL on a mobile device?
304

Receive a user-agent string identifying the mobile device, and assess compatibility of mobile device based on the user-agent string.
305

Receive geolocation from the mobile device, and identify POS terminal(s) local to the consumer based on geolocation.
306

Provide consumer, via the transaction-specific web page, list of local POS terminal(s).
307

Did consumer select POS terminal for providing the payment?
Is consumer at POS terminal and ready to provide payment?
308

Display token ID on the transaction-specific web page.
309

Receive confirmation from POS terminal that consumer has presented token ID and payment to POS terminal.
310

Verify payment.
311

Display a transaction receipt on the transaction-specific web page.
312

FIG. 3

SYSTEM AND METHOD FOR FACILITATING CASH PAYMENT TRANSACTIONS USING A MOBILE DEVICE

SUMMARY

Disclosed herein are systems and methods for facilitating transactions between a merchant-partner and an end-user. More specifically, presented herein are systems and methods for facilitating cash payment transactions using an end-user's mobile device. For example, in one embodiment, the systems and methods generally call for a service provider: (a) staging a transaction between a merchant and a consumer; (b) obtaining the consumer's contact information (e.g., the consumer's mobile telephone number or e-mail address); (c) creating a transaction-specific unique reference locator (URL) linked to a transaction-specific web page; and (d) sending the transaction-specific URL to the consumer. Whereupon the consumer accesses the transaction specific web page from a mobile device, via the transaction-specific URL, the service provider: (e) displays a token ID on the transaction-specific web page. The token ID, which is linked to the staged transaction, is then used to initiate data communication between a point-of-sale (POS) terminal and the service provider's processing unit. The service provider can then: (f) receive confirmation that the consumer has presented the token ID and a payment to the POS terminal; (g) display a transaction receipt on the transaction-specific web page; and/or (h) notify the merchant that the consumer has provided the payment.

Aspects of the present invention are particularly useful in providing merchants (e.g., web-based or catalog-based merchants) with a means for conducting fast, easy, and secure cash transactions with consumers. The present invention is also particularly useful in facilitating cash transactions such as: loan repayments, collections, money transfers, bill payments, remote deposits, etc.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

FIG. 3 is a flowchart illustrating one embodiment presented herein.

RELATED APPLICATIONS

Figure 1:
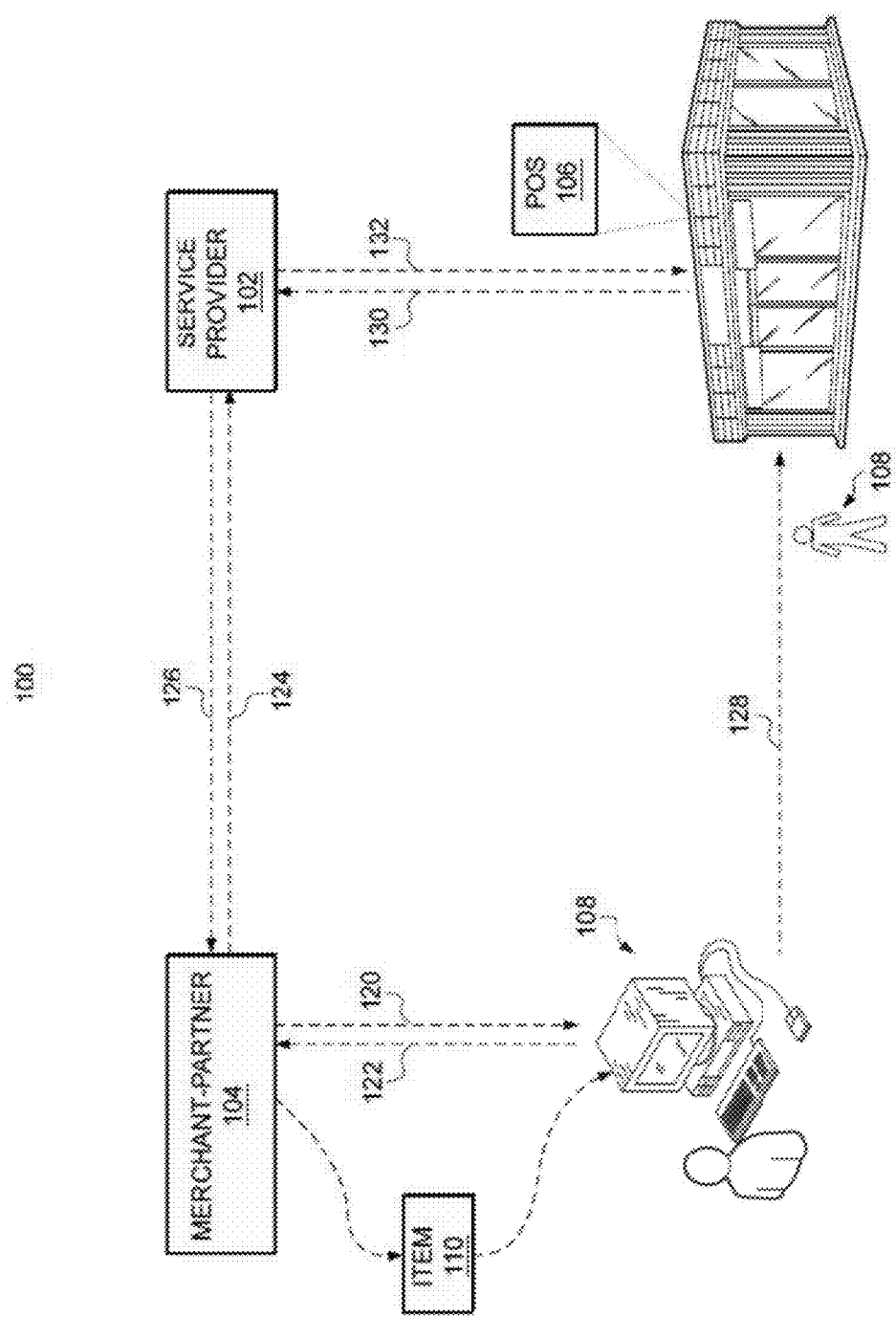
FIG. 1 is a high-level flow process chart illustrating the relationships between the parties that partake in the presented systems and methods.

Except for any term definitions that conflict with the term definitions provided herein, the following related, co-owned, and co-pending applications are incorporated by reference in their entirety: U.S. patent application Ser. Nos. 13/087,271; 13/123,067; 13/175,657; 13/209,291; 13/267,642; 13/298,179; and 13/312,835.

DETAILED DESCRIPTION

Embodiments of the present invention generally relate to systems and methods for facilitating transactions between a merchant-partner and an end-user. For example, the present invention provides a merchant-partner with a means for conducting a cash transaction via a remote point-of-sale (POS) terminal. The present invention is particularly useful in facilitating transactions such as: sale/purchase agreements, loan repayments, collections, money transfers, bill payments, remote deposits, etc. In one embodiment, a service provider and/or POS terminal serves as an intermediary between a merchant-partner and the end-user. The system allows the end-user to pay for the merchant-partner's goods/services/obligations in cash (or cash equivalents) at a POS terminal. The POS terminal and/or service provider then notifies the merchant-partner that the end-user has made a payment. After the merchant-partner has received a notification, validation, or otherwise confirmation of payment, the merchant-partner can securely complete the agreed upon transaction between the merchant-partner and the end-user.

However, in order for such system to be commercially viable, the systems and methods presented generally include the process steps of: (a) staging a transaction between the merchant-partner and the end-user; (b) tokenizing the transaction by linking one or more transaction instructions to one or more token IDs; (c) providing the end-user with the one or more token IDs, wherein the end-user can then present the token ID and a payment to a POS terminal; (d) receiving confirmation that the end-user has presented, to a POS terminal, the token ID and a payment in accordance with the one or more transaction instructions; (e) notifying the merchant-partner that the end-user provided the payment to the POS terminal; and (f) settling the transaction between the POS terminal and the merchant-partner. Similar systems and methods are discussed in more detail in the above-reference, co-owned, and co-pending applications, which have been incorporated by reference.

The present invention, expands on and further develops the systems and methods disclosed in the above-referenced applications. More specifically, presented herein are systems and methods for facilitating cash payment transactions using an end-user's mobile device. Amongst other things, the presented systems and methods provide a unique and effective way of providing the end-user with the token ID using the functionality of an end-user's mobile device. For example, in one embodiment, the systems and methods generally call for a service provider: (a) staging a transaction between a merchant and a consumer; (b) obtaining the consumer's contact information (e.g., the consumer's mobile telephone number or e-mail address); (c) creating a transaction-specific unique reference locator (URL) linked to a transaction-specific web page; and (d) sending the transaction-specific URL to the consumer. When the consumer accesses the transaction specific web page from a mobile device (e.g., via the transaction-specific URL), the service provider: (e) displays a token ID on the transaction-specific web page. The token ID may be in the form of: a barcode, a pin number, and/or a quick response (QR) code. The token ID, which is linked to the staged transaction, is then used to initiate data communication between a POS terminal and the service provider's processing unit. The service provider can then: (f) receive confirmation that the consumer has presented the token ID and a payment to the POS terminal; (g) validate/verify the transaction; (h) display a transaction receipt on the transaction-specific web page; and/or (i) notify the merchant that the consumer has provided the payment.

Before describing the invention in more detail, it is appropriate to define certain terms and phrases. The terms "merchant" and "merchant-partner" are used interchangeably herein. It is noted that the term "merchant" and/or "merchant-partner" is not limited to entities that directly sell goods/services. For example, a merchant may be a loan service, collections service, money transfer service, bill payment service, bank deposit service, credit union, etc. The terms "consumer," "customer," and "end-user" are used interchangeably herein, and generally refer to a buyer of goods/services provided by a merchant. However, it is noted that the use of the systems and methods presented is not strictly limited to sale/purchase transactions between a seller and a buyer. The systems and methods presented may be used to facilitate transactions between: two or more individuals, an individual and one or more businesses, two or more businesses, etc. The systems and methods presented may also be used to facilitate transactions between any two or more parties that have a pre-existing relationship or obligation(s). The terms "point-of-sale," "point-of-sale terminal," "POS," "POS terminal," and "point-of-payment" are used interchangeably herein, and generally refer to the location where a payment is received from a consumer. It is also noted that terms such as "POS" or "POS terminal" may include the actual terminal where payment is presented and received (e.g., the cash register), or may include the POS back office, or any entity controlling one or more of the actual terminals. The terms "service provider" and "payment processor" are used interchangeably herein, and generally refer to the functional unit(s) for implementing the systems and methods presented. As used herein, a service provider may be an independent, stand-alone entity, or may be a functional sub-system of a merchant-partner and/or POS.

The following is a description of one or more embodiments of the present invention, with reference to FIGS. 1-20. It is to be understood that the present invention is not limited to the particular embodiments described. It is also to be understood that the terminology used herein is for the purpose of describing particular embodiments only, and is not intended to be limiting, since the scope of the present invention will be limited only by the appended claims.

FIG. 1 is a high-level flow process chart, illustrating the relationships between the parties that partake in the presented system 100. In general, system 100 includes four key parties: (1) service provider 102; (2) merchant-partner 104; (3) POS 106; and (4) end-user 108. The dashed lines in FIG. 1 generally represent a flow of information, data, or process between respective parties. In practice, the dashed lines in FIG. 1 represent user interfaces and/or application program interfaces (APIs) for the transmission of information, data, instructions, funds, etc.

As will be described further below, service provider 102 and POS 106 play a central role in facilitating transactions between merchant-partner 104 and end-user 108. In one embodiment, each party serves a stand-alone function within system 100. However, in an alternative embodiment, service provider 102 may be incorporated into, or be a functional unit of, merchant-partner 104 and/or POS 106. Further, merchant-partner 104 may be any type of merchant, seller, or retailer; such as an online, web-based merchant, or catalog-based merchant. POS 106 (and/or POS terminal) may be a local retailer (e.g., relative to end-user 108), ATM, kiosk, or other cash-exchange terminal, intermediary, or equivalent thereof. POS 106 (and/or POS terminal) may be disclosed/identified to the end-user 108 via one or more of the systems described below, such as via a computer or smart phone connection to merchant-partner 104 or service provider 102.

In FIG. 1, process flow 120 and 122 represents an exchange between merchant-partner 104 and end-user 108. In the example shown, merchant-partner 104 provides end-user 108 with a user-interface to purchase a goods/services. For example, the merchant may provide the user with a "checkout" experience over: a web page on a merchant's website; an interface on a mobile device; an interactive voice system over a telephone network; or any interface equivalent thereof. While known customer user-interfaces may provide a "checkout" experience that allows an end-user to enter their credit card information, the system shown in FIG. 1 provides the end-user with a checkout experience that allows the end-user to pay for the goods/services in cash (or cash equivalents).

If the end-user selects to pay in cash, then merchant-partner 104 interfaces and exchanges information with service provider 102, as represented by process flow 124, 126. In practice, merchant-partner 104 and/or service provider 102 stages a transaction by linking a set of one or more transaction instructions to end-user 108. The transaction instructions may vary, but generally include instructions on what actions (e.g., payments) need to be performed by end-user 108 in order for merchant-partner 104 to provide end-user 108 with the agreed upon goods/services (e.g., item 110). The transaction instructions may include actions to be performed by the end-user 108, merchant-partner 104, service provider 102, or any combination thereof.

Service provider 102 then "tokenizes" the staged transaction by linking the set of one or more transaction instructions to a token ID. (The terms "token," "token ID," "unique payment identifier," and "PID" are used interchangeably herein.) In an alternative embodiment, a single token ID can be linked to multiple staged transactions and/or multiple merchant-partners. The token ID is then provided to end-user 108. The token ID can be provided to the end-user 108 either directly from service provider 102, POS 106, or merchant-partner 104. FIGS. 5-20 illustrate exemplary embodiments of how the token ID is provided to end-user 108 via an end-user mobile device.

When end-user 108 is ready to make a payment, end-user 108 presents the token ID to POS 106, along with an appropriate payment, as represented by process flow 128. At POS 106, the token ID serves as a means of linking the end-user's payment to the one or more transaction instructions. In other words, when end-user 108 presents the token ID and payment to POS 106, the token ID is used to initiate data communication between POS 106 and service provider 102, and thereby route the presentment information to service provider 102, as represented by process flow 130, 132. Service provider 102 may then validate that the presentment was in accordance with the transaction instructions linked to the token ID. If the end-user's payment is in accordance with the transaction instructions linked to the token ID, then service provider 102 notifies merchant-partner 104 that a payment has been made. Merchant-partner 104 then completes the transaction by, for example, shipping item 110 or otherwise fulfilling the transaction and/or crediting end-user's 108 account with merchant-partner 104. Service provider 102 then settles the transaction between merchant-partner 104 and POS 106 by receiving the payment funds (minus any agreed upon service fees) from POS 106, and delivering the payment funds (minus any agreed upon service fees) to merchant-partner 104.

In an alternative embodiment, the systems and methods described herein do not require merchant-partner 104 to provide end-user 108 with a checkout experience. There is also no requirement that the end-user provide an intent or selection of a cash payment option. For example, in one embodiment, merchant-partner 104 provides its customers with one or more tokens as a means for the customers to make payments. The payments can be made at a POS terminal, and a series of staged transactions may proceed, without any front-end involvement by end-user 108.

Figure 2:
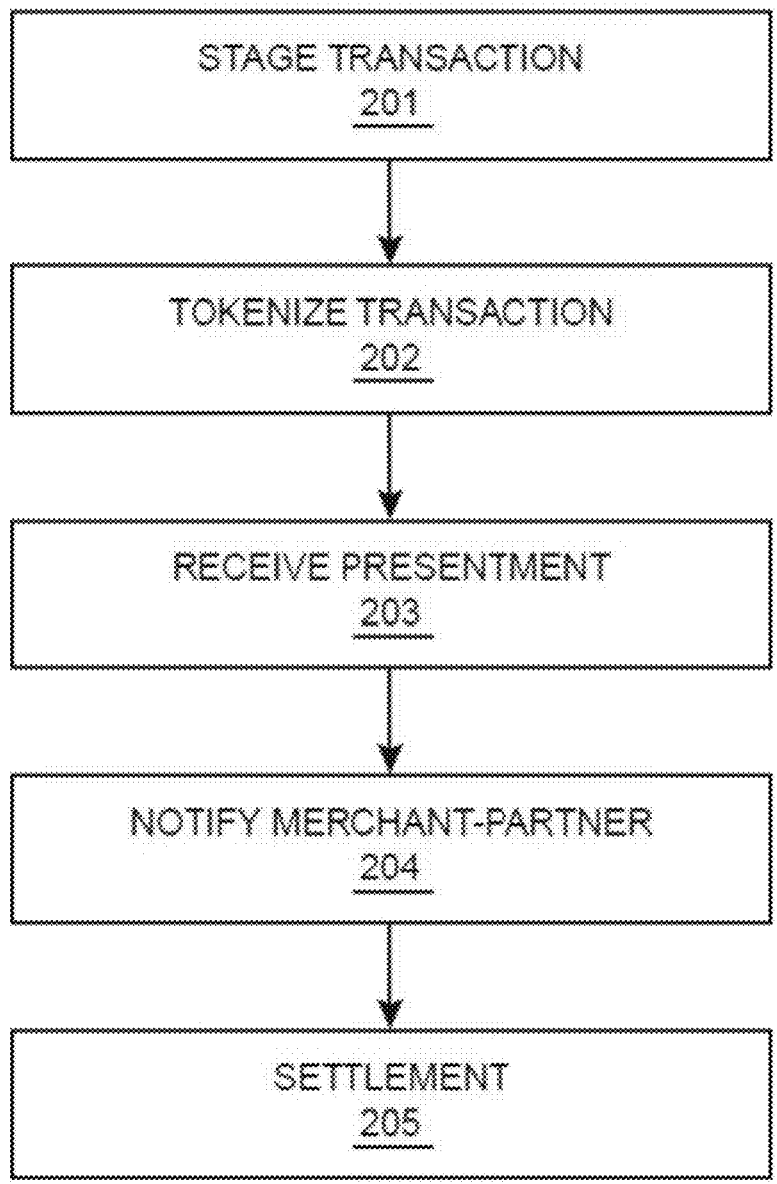
FIG. 2 is a high-level flowchart illustrating a method for facilitating transactions, in accordance with one embodiment presented herein.

FIG. 2 is a high-level flowchart illustrating a method 200 for facilitating a transaction between a merchant-partner and an end-user, in accordance with one embodiment presented herein. More specifically, FIG. 2 is a flowchart generally illustrating the steps performed in the system described in FIG. 1. The method includes: (a) staging a transaction (step 201); (b) tokenizing the staged transaction (step 202); (c) receiving the presentment (step 203); (d) notifying the merchant-partner that the presentment has been received (step 204); and (e) settling the transaction between the parties (step 205). Additional details for steps (a)-(d) are provided in, for example, U.S. application Ser. Nos. 13/087,271; 13/123,067; and 13/312,835, which are incorporated by reference herein.

FIG. 3 is a flowchart illustrating one embodiment of the present invention. More specifically, FIG. 3 illustrates a method 300 for providing a consumer with the token ID created in step 202. In step 301, a transaction-specific URL is created and linked to a transaction-specific web page. In practice, the transaction-specific web page may be maintained on the service provider's server. Additionally, step 301 typically occurs after the transaction has been staged in step 201. As such, the transaction-specific URL and transaction-specific web page can also be linked to the staged transaction and/or token ID. In step 302, the consumer is provided with a prompt to enter their contact information. Such prompt can be provided on the merchant's web page, or by redirecting the consumer to the service provider's web page. The consumer's contact information can then be linked to the staged transaction. Alternatively, if the merchant is already in possession of the consumer's contact information, such contact information can be included in the staged transaction. Such contact information may include details such as mobile telephone numbers, e-mail addresses, instant messaging usernames, handles, etc. In step 303, the URL is sent to the consumer. Preferably, the consumer's contact information is used to lead the consumer into accessing/receiving the URL on their mobile device. For example, if a staged transaction includes a consumer's e-mail address and mobile telephone number, the service provider's processing system can select to send the URL to the consumer via a short message service (SMS) text message to their mobile phone. Alternatively, an e-mail can be sent, but the e-mail can ask the consumer to access the URL with their mobile device (be it a mobile phone, tablet, etc.).

In step 304, the service provider's processing unit determines whether the consumer clicked on the URL on a mobile device. If not, the service provider may continue a non-mobile implementation of the process steps of FIG. 2, as described in the above-referenced applications. However, if the consumer has chosen to access/receive the URL on a mobile device, the service provider's processing unit receives a user-agent string identifying the mobile device, and assess compatibility of the mobile device based on the user-agent string, in step 305. By assessing compatibility, the service provider's processing unit can adjust the text, type, format, etc., of the information that is presented to the consumer's mobile device. The service provider can also select/modify the token ID based on the compatibility of the consumer's mobile device.

In step 306, the service provider's processing unit can receive a geolocation from the mobile device, and identify one or more POS terminals that may be local to the consumer, based on geolocation. The one or more local POS terminals can then be provided to the consumer as a list (or as pin-points on a map), via the transaction-specific web page, in step 307. Alternatively, the consumer can enter their zip code, or a preselected POS terminal, and steps 306 and 307 can be skipped. In step 308, the service provider's processing unit determines whether the consumer selected a POS terminal for providing the payment and/or whether the consumer is at the POS terminal and ready to provide the payment.

In step 309, the token ID is displayed on the transaction-specific web page. The token ID serves as a means to initiate data communication between the POS terminal and the service provider's processing unit. The token ID is used by the service provider to identify the staged transaction, and allows the service provider to confirm whether or not the payment is consistent with the staged transaction instructions. For example, in the embodiment wherein the token ID is a barcode, the POS terminal attendant scans the barcode and the POS terminal recognizes that the barcode requires an application programming interface (API) call to the service provider's processing unit. In step 310, the service provided receives confirmation from the POS terminal that the consumer has presented the token ID and the payment to the POS terminal; i.e., the service provider receives "presentment data" from the POS terminal. With said presentment data, the service provider can validate or otherwise verify the transaction and payment, as in step 311. Because the consumer is using their mobile device to display the token ID on the transaction-specific web page, the service provider can refresh the transaction-specific web page upon verification of the payment. The service provider can then display a transaction receipt on the transaction-specific web page, in step 312.

Figure 5:
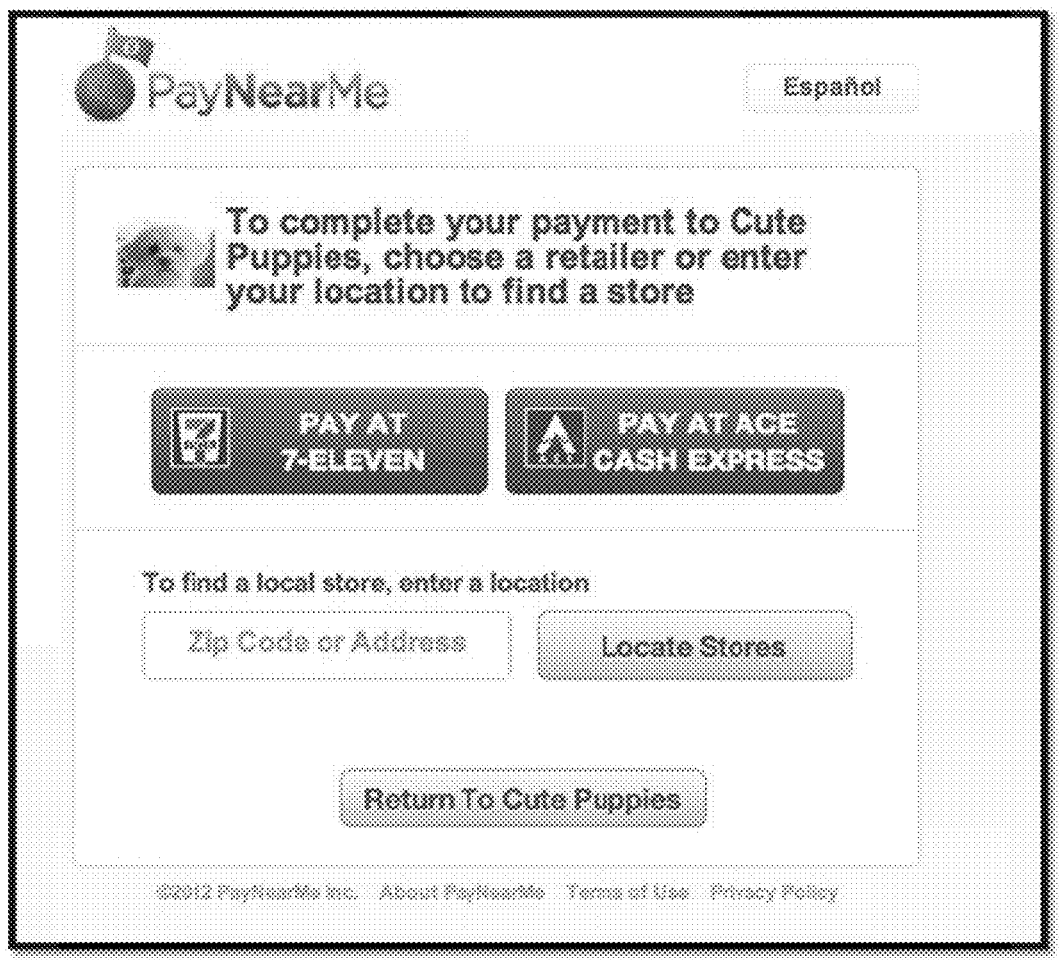
FIG. 5 is a screenshot of an embodiment of the present invention.
Figure 6:
FIG. 6 is another screenshot of an embodiment of the present invention.
Figure 7:
FIG. 7 is another screenshot of an embodiment of the present invention.
Figure 8:
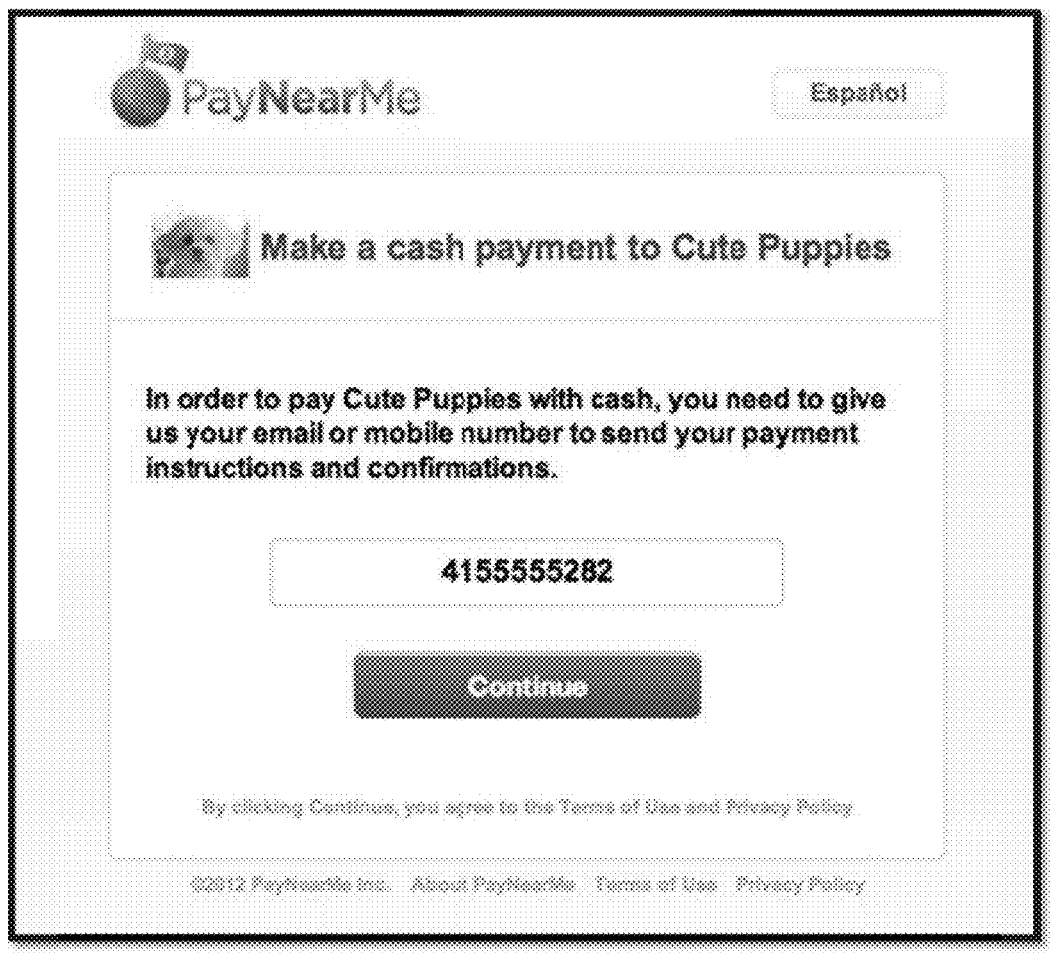
FIG. 8 is another screenshot of an embodiment of the present invention.

FIGS. 5-20 are screenshots illustrating an embodiment of the present invention. For example, FIG. 5 shows a screenshot of a payment page for a web-based merchant (e.g., "Cute Puppies"). In FIG. 5, the consumer is given the option to select between multiple POS terminals to complete their purchase transaction. FIG. 6 shows a screenshot after the consumer has selected 7-ELEVEN™ as their POS terminal. In FIG. 6, the consumer is given the option to print a token ID, or have a token ID sent to their mobile device by clicking the "Use Mobile" icon. FIG. 7 shows a print-out of the token ID and transaction instructions if the user clicks the "Print" icon shown in FIG. 6. However, if the consumer clicks the "Use Mobile" icon, the consumer is prompted to enter their e-mail or mobile number, as shown in the screenshot of FIG. 8. Alternatively, the consumer's contact information may be provided by other means, such as directly from a database provided by the merchant, POS, and/or service provider. As such, the consumer's contact information can merely be "confirmed" by the consumer.

Figure 9:
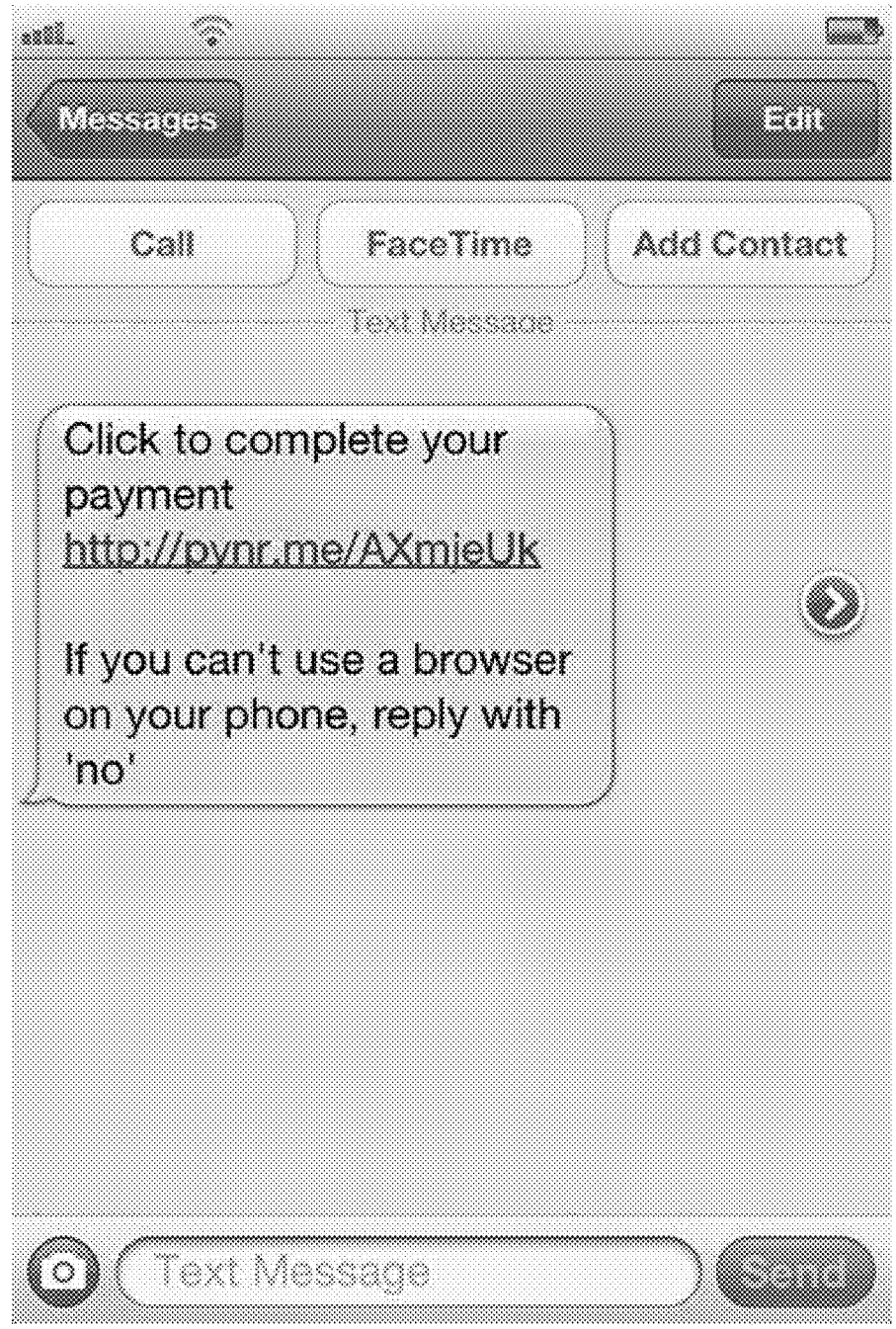
FIG. 9 is another screenshot of an embodiment of the present invention.
Figure 10:
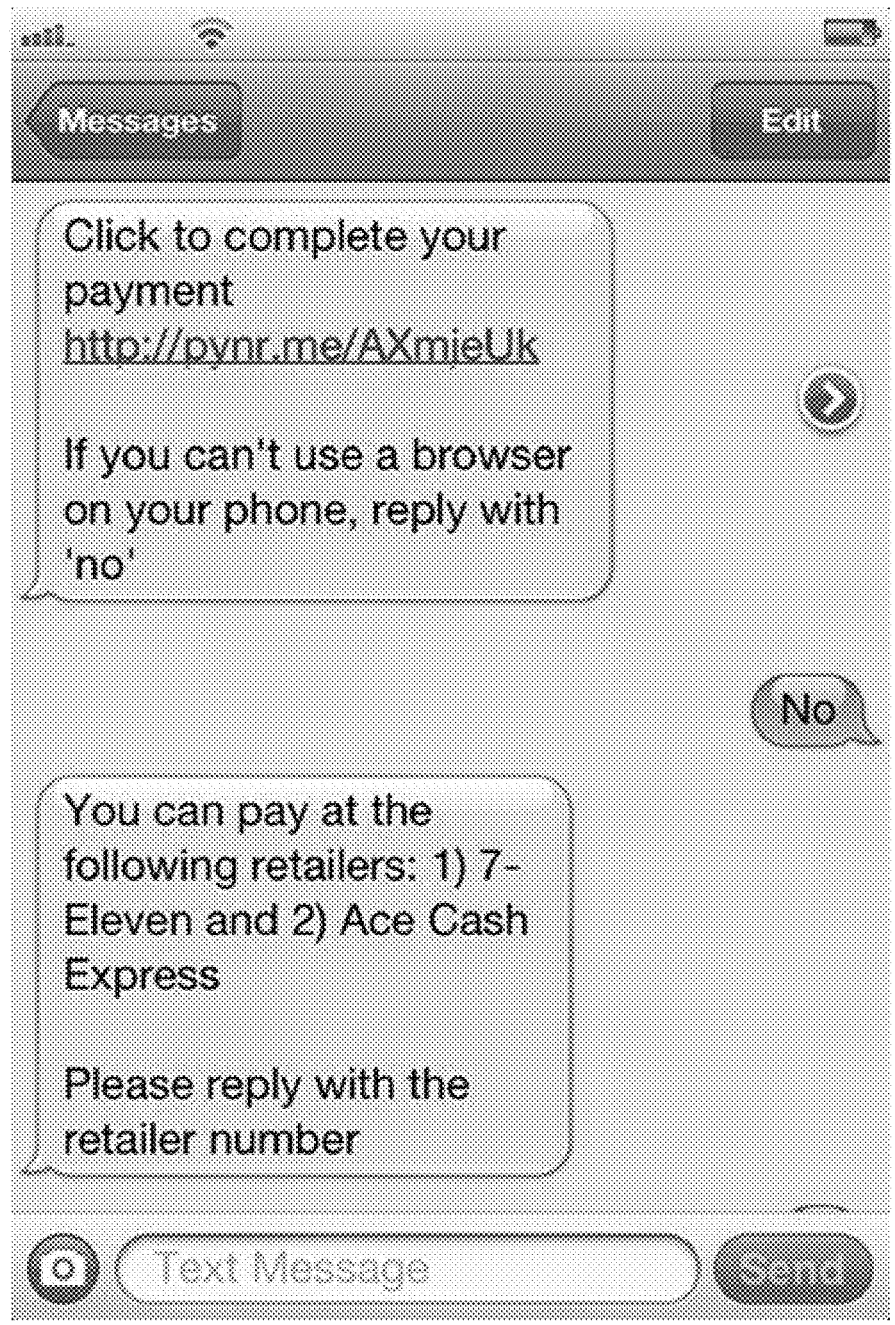
FIG. 10 is another screenshot of an embodiment of the present invention.
Figure 11:
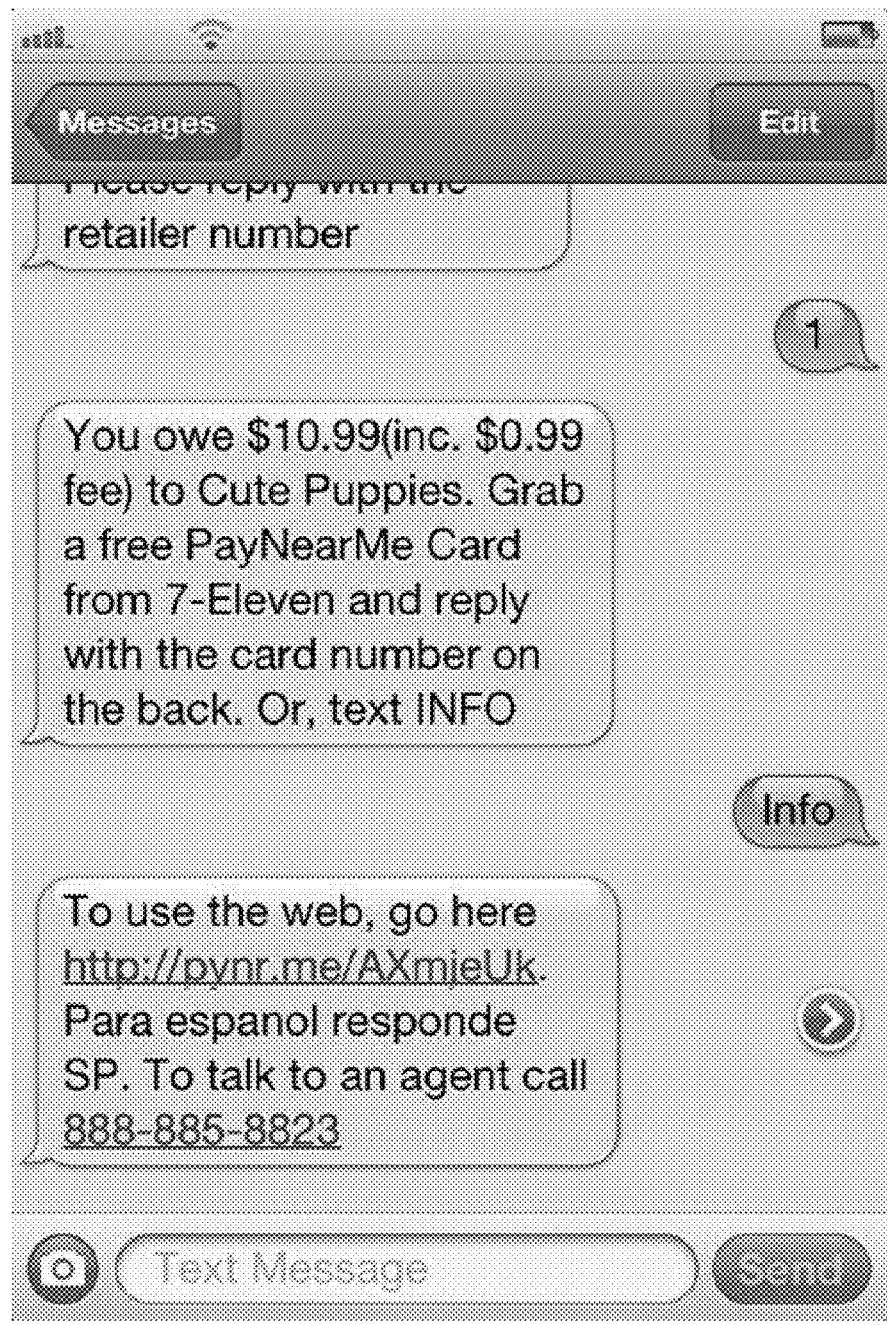
FIG. 11 is another screenshot of an embodiment of the present invention.
Figure 12:
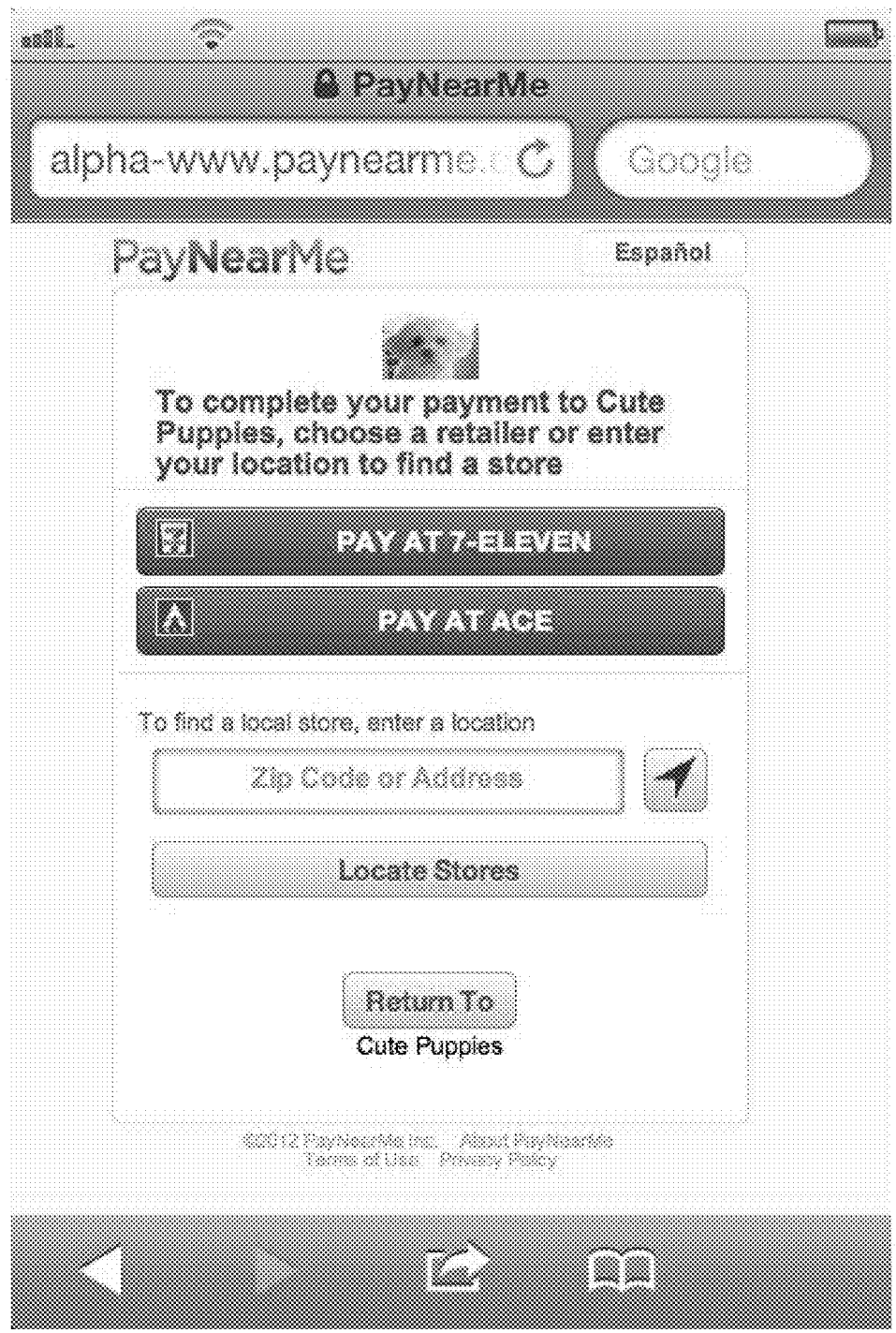
FIG. 12 is another screenshot of an embodiment of the present invention.
Figure 13:
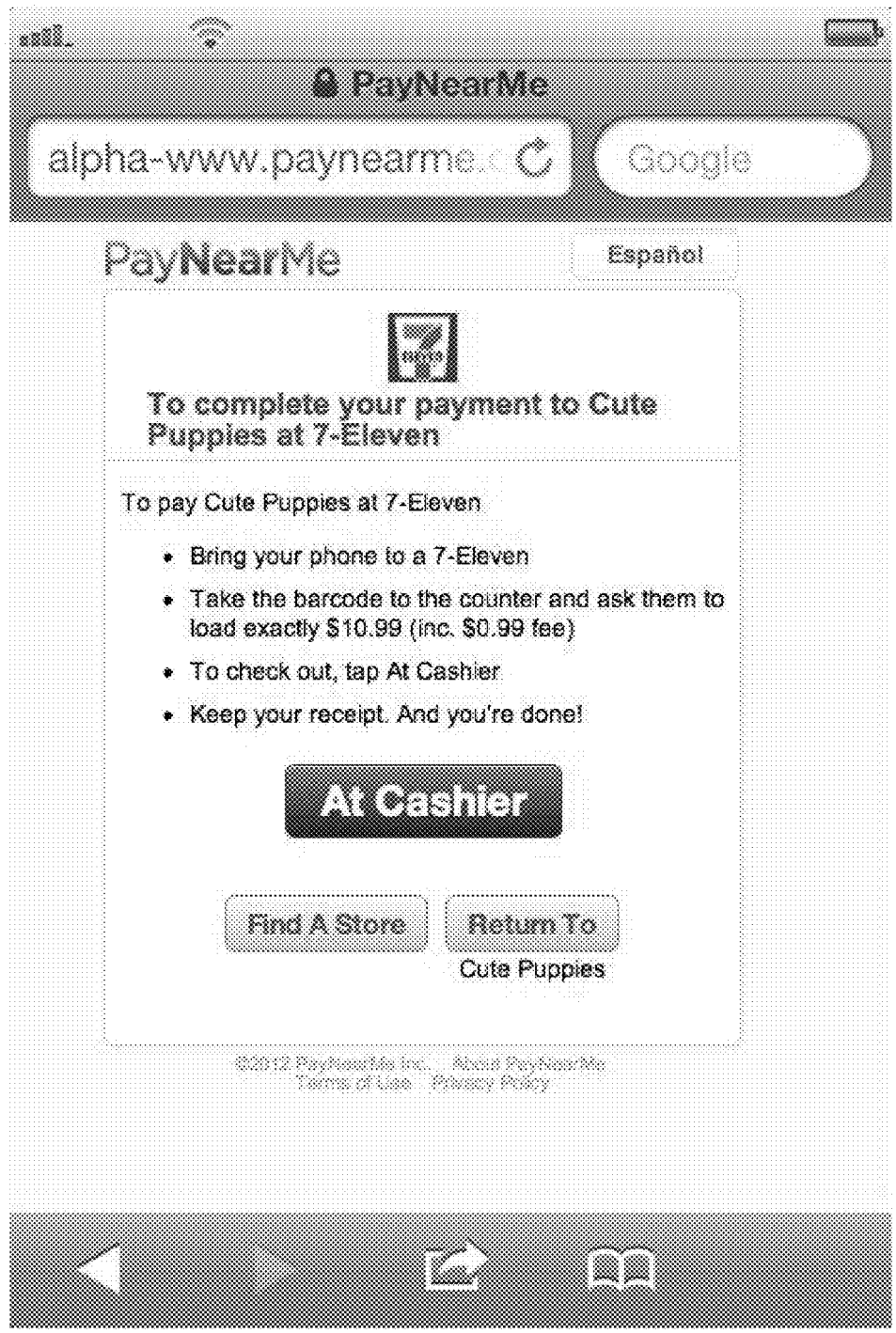
FIG. 13 is another screenshot of an embodiment of the present invention.

FIG. 9 shows a mobile screenshot of an SMS text message sent to the consumer with a transaction-specific URL, that is linked to a transaction-specific web page. The consumer, however, is given the option of proceeding via a back-and-forth SMS text message exchange with the service provider. For example, if the consumer's mobile device does not have "browser capability," the consumer can send a return text of "No," in which case the service provider will send SMS text message instructions, as shown in FIGS. 10 and 11. If the consumer clicks on the transaction-specific URL, the process proceeds to the screen shown in FIG. 12. More specifically, FIG. 12 shows the consumer accessing the transaction-specific web page on their mobile device (e.g., on a mobile browser or dedicated mobile application (or "app")). The transaction-specific web page provides transaction instructions for the consumer to complete the transaction. For example, FIG. 12 shows a transaction-specific web page with a prompt asking the user to select their POS terminal, or enter a zip code or address to locate local POS terminals.

Figure 14:
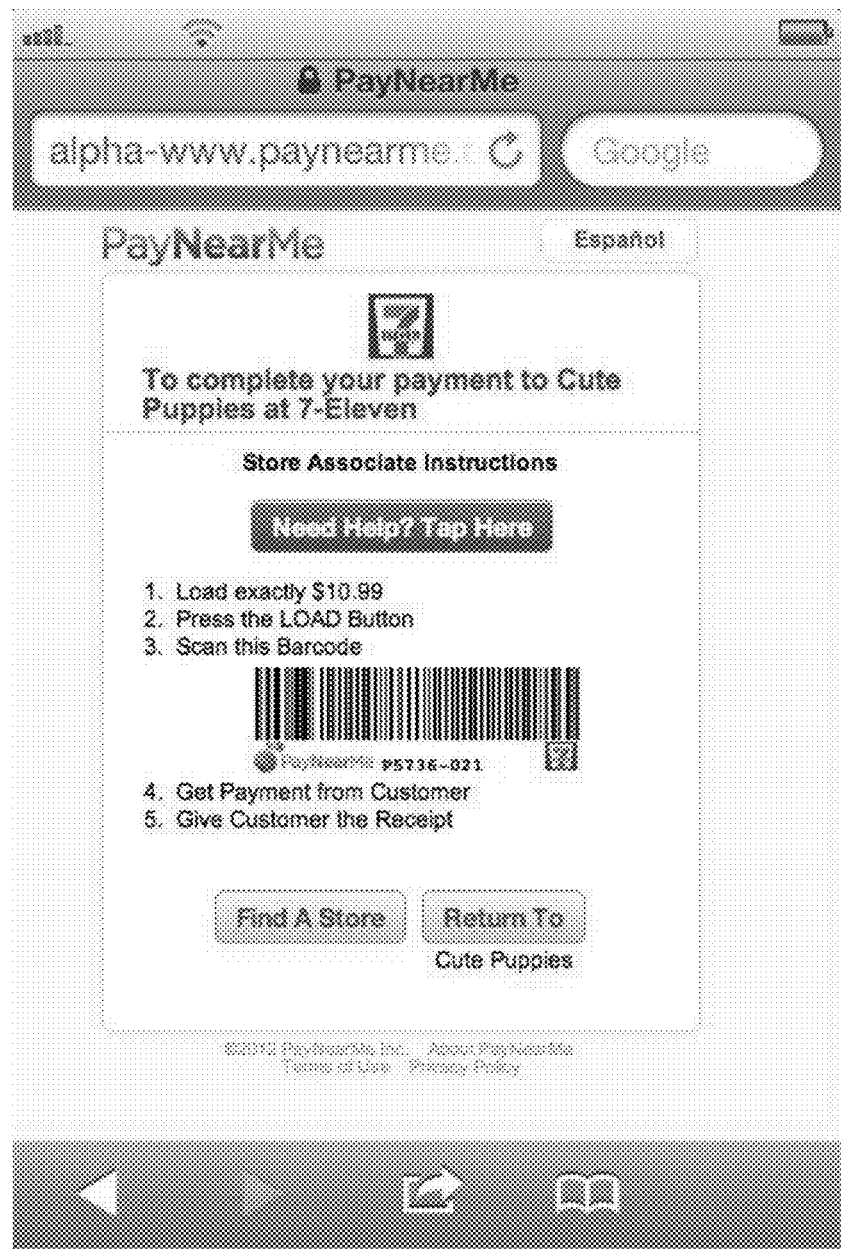
FIG. 14 is another screenshot of an embodiment of the present invention.

Once the consumer has selected a local POS terminal, the transaction-specific web page is refreshed by the service provider to show additional transaction instructions. When the consumer is at the POS terminal, they can click on the icon "At Cashier" to proceed to POS instructions, as shown in FIG. 14. In other words, FIG. 14 shows transaction instructions for the POS terminal. In FIG. 14, the token ID is displayed in the form of a barcode. The POS terminal can then scan the barcode to initiate communication with the service provider. In other words, the barcode is used as a means for initiating the transfer of presentment data to the service provider.

Figure 15:
FIG. 15 is another screenshot of an embodiment of the present invention.
Figure 16:
FIG. 16 is another screenshot of an embodiment of the present invention.
Figure 17:
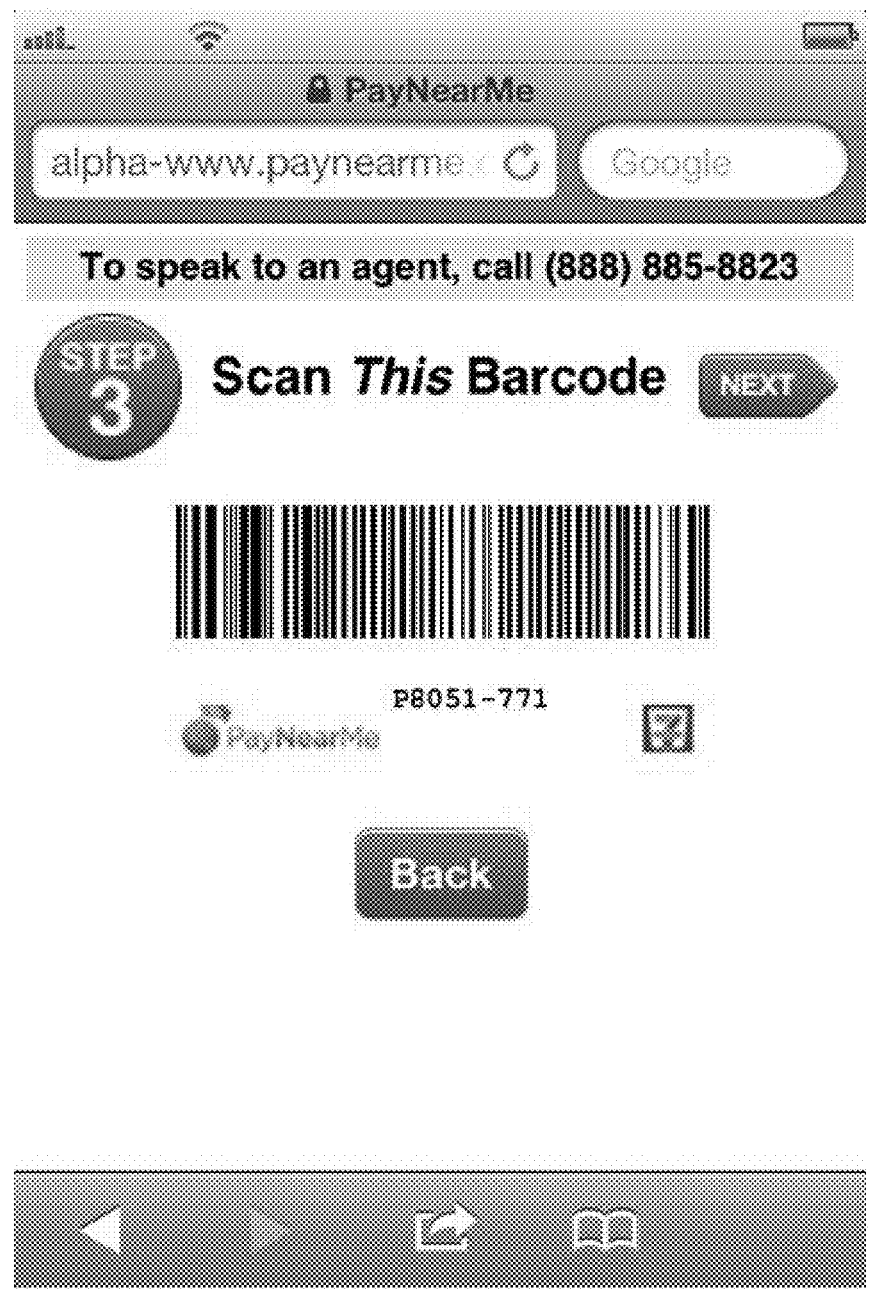
FIG. 17 is another screenshot of an embodiment of the present invention.
Figure 18:
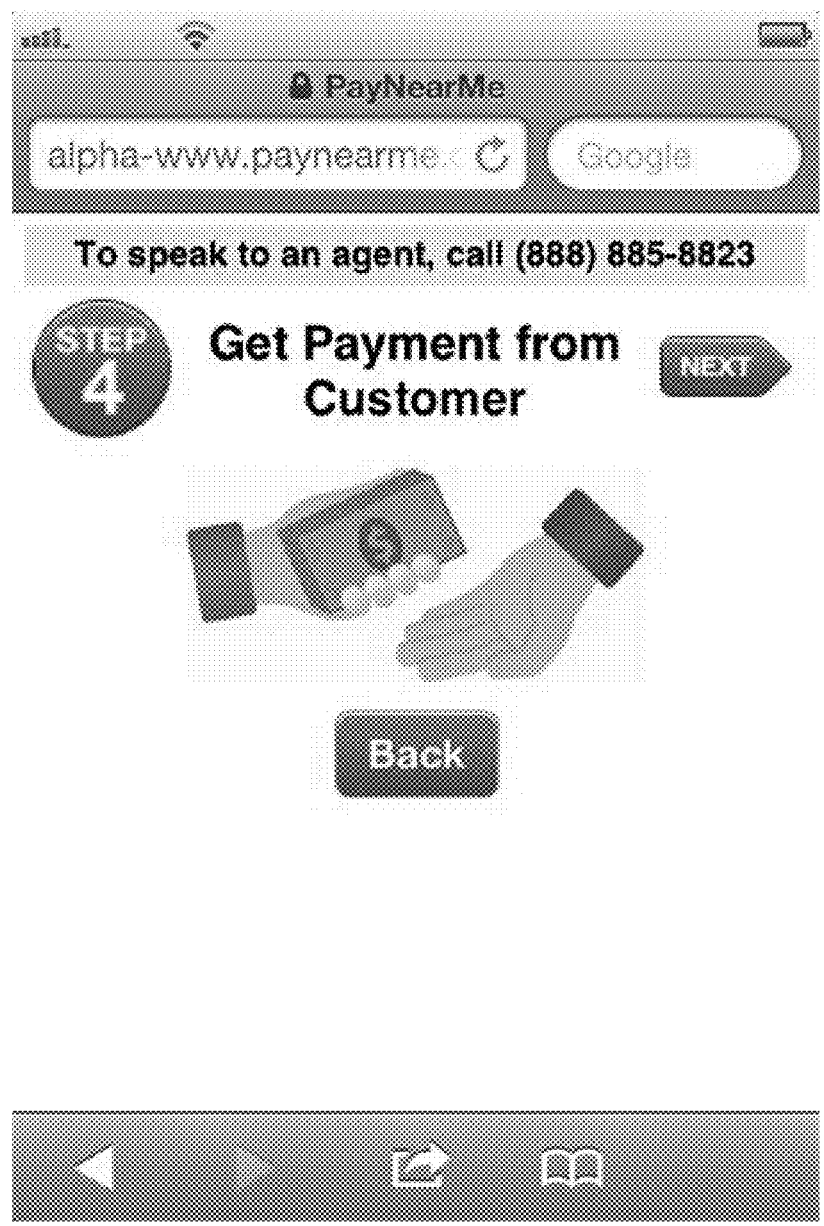
FIG. 18 is another screenshot of an embodiment of the present invention.
Figure 19:
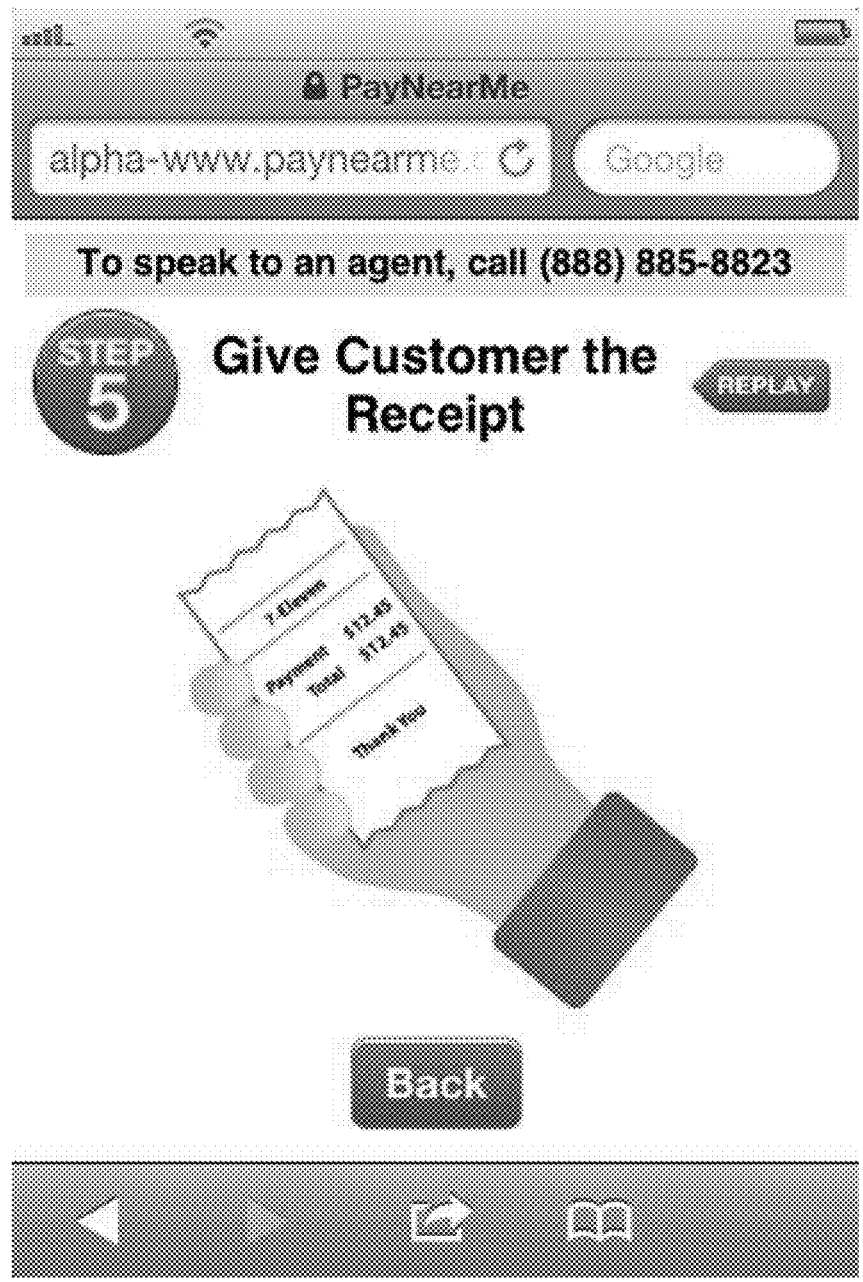
FIG. 19 is another screenshot of an embodiment of the present invention.
Figure 20:
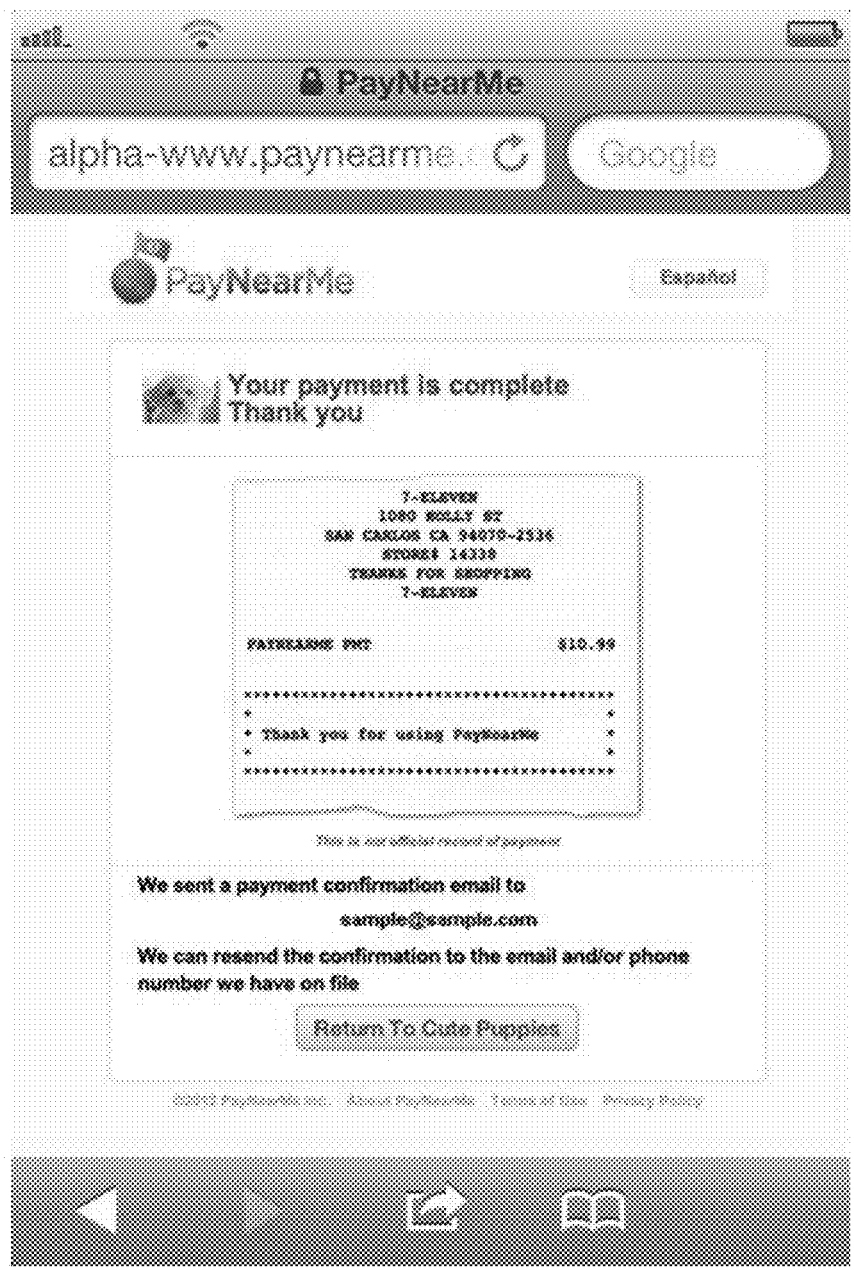
FIG. 20 is another screenshot of an embodiment of the present invention.

If, however, the POS terminal attendant is unsure of how to process the transaction, a "Need Help? Tap Here" icon is provided on the transaction-specific web page. If the consumer or POS terminal attendant clicks on the "Need Help? Tap Here" icon, a transaction-specific instruction set is provided by the service provider on the transaction-specific web page. The service provider can select the transaction-specific instruction set based on the POS terminal selected by the consumer. FIGS. 15-19 illustrate screen shots of a transaction-specific instruction set. Each screenshot shown in FIGS. 15-19 is customized to the consumer's transaction. For example, FIG. 15 illustrates a terminal that matches the POS terminal. FIG. 15 also illustrates the transaction amount. FIGS. 16-19 then show ensuing steps to be performed by the POS terminal attendant.

After the consumer has made a payment in accordance with the transaction instructions, and the service provider has validated the payment, the service provider can refresh (or otherwise update) the transaction-specific web page to show a receipt for the transaction. The receipt text can provide additional instructions and/or promotions for the consumer. The receipt text can also mimic the receipt text that would be (or is) otherwise provided by the POS terminal.

Additional Embodiments

In one embodiment, there is provided a computer-implemented method for facilitating a payment for goods or services between an online merchant and a consumer. The method calls for the consumer to provide a purchase request on a web-based interface, and the payment for the purchase request at a consumer-selected point-of-sale (POS) terminal that is local to the consumer and remote to the merchant. The purchase request may be received at a service provider processing unit, from the merchant's web-based interface, based on directives from a merchant server. The purchase request may be received at a service provider processing unit, from the merchant's web-based interface, via an application programming interface (API) call from the merchant server. As would be appreciated by one of skill in the art, alternatives to web-based interfaces are within the scope of the present invention. In other words, any means for communicating and/or transmitting information from the consumer and/or merchant may be employed; for example, an application (i.e., "app") on a mobile device, an interactive voice response (IVR) system, a third-party database, an operator-assisted phone call, or any other equivalent means.

The method comprises a service provider processing unit performing the steps of: (a) receiving the purchase request from the web-based interface; (b) staging a transaction in a database by creating a database entry linking one or more transaction instructions to the consumer; (c) creating a transaction-specific unique reference locator (URL) linked to a transaction-specific web page for displaying the one or more transaction instructions; (d) providing the consumer with a web-based prompt to enter their contact information; (e) receiving the consumer's contact information and linking the contact information to the database entry; and (f) using the provided contact information to send the transaction-specific URL to the consumer. The consumer may provide their contact information in the form of an e-mail address or a telephone number. The transaction-specific URL may be sent to the consumer in an e-mail or a short message service (SMS) text message. Whereupon the consumer clicking the transaction-specific URL on a mobile device, the service provider processing unit further performs the steps of: (g) receiving a user-agent string identifying the mobile device; (h) assessing compatibility of the mobile device based on the user-agent string; (i) receiving a geolocation from the mobile device; (j) identifying one or more POS terminals local to the consumer based on geolocation; and (k) providing the consumer, via the transaction-specific web page, a list of the one or more POS terminals. Whereupon the consumer's selection of a POS terminal for providing the payment, the service provider processing unit further performing the step of: (l) displaying a token ID on the transaction-specific web page, wherein the token ID is linked to the database entry and is used to initiate data communication between the consumer-selected POS terminal and the service provider processing unit. The token ID may be in a form selected from the group consisting of: a barcode, a pin number, and a QR code.

In alternative embodiments, the consumer's contact information may be obtained via an interface such as an application (i.e., "app") on a mobile device, an IVR system, a third-party database, an operator-assisted phone call, or any other equivalent means for sharing and/or obtaining information from the consumer.

The method may further comprise: (m) providing the consumer-selected POS terminal with a communication interface such that the consumer-selected POS terminal can confirm that the consumer has presented the token ID and provided the payment to the POS terminal; and the service provider processing unit then performing the steps of: (n) receiving confirmation that the consumer has presented the token ID and the payment to the POS terminal; (o) verifying that the payment is in accordance with the one or more transaction instructions; and/or (p) displaying a transaction receipt on the transaction-specific web page. The method may further include the step of (q) notifying the merchant that the consumer has provided the payment; and/or (r) the service provider processing unit performing the step of selecting the form of the token ID based on the POS terminal selected by the consumer.

In another embodiment, there is provided a method for facilitating a transaction between a merchant and a consumer, wherein the consumer provides a payment for the transaction at a consumer-selected POS terminal. The method includes a service provider processing unit performing the steps of: (a) receiving a service request; (b) staging a transaction in a database by creating a database entry linking one or more transaction instructions to the consumer; (c) creating a transaction-specific URL linked to a transaction-specific web page for displaying the one or more transaction instructions; and (d) using consumer contact information to send the transaction-specific URL to the consumer. Whereupon the consumer accesses the transaction specific web page from a mobile device, via the transaction-specific URL, the service provider processing unit further performs the steps of: (e) identifying one or more available POS terminals; and (f) displaying the one or more available POS terminals on the transaction-specific web page. Whereupon the consumer selects a POS terminal for providing the payment, the service provider processing unit performs the step of: (g) displaying a token ID on the transaction-specific web page, wherein the token ID is linked to the database entry and is used to initiate data communication between the consumer-selected POS terminal and the service provider processing unit. The token ID may be in a form selected from the group consisting of: a barcode, a pin number, and a QR code. The service provider processing unit may further perform the steps of: (h) receiving confirmation that the consumer has presented the token ID and the payment to the POS terminal; (i) displaying a transaction receipt on the transaction-specific web page; and/or (j) notifying the merchant that the consumer has provided the payment.

In yet another embodiment, there is provided a method for facilitating a payment between a merchant and a consumer, wherein the consumer provides the payment at a consumer-selected POS terminal. The method comprises a service provider processing unit performing the steps of: (a) staging a transaction in a database by creating a database entry linking one or more transaction instructions to the consumer; (b) creating a transaction-specific URL linked to a transaction-specific web page for displaying the one or more transaction instructions; and (c) sending the transaction-specific URL to the consumer via a SMS text message. Whereupon the consumer clicks the transaction-specific URL on a mobile device, the service provider processing unit performs the steps of: (d) displaying the one or more transaction instructions on the transaction-specific web page; and (e) displaying a token ID on the transaction-specific web page, wherein the token ID is linked to the database entry and is used to initiate data communication between the consumer-selected POS terminal and the service provider processing unit. The token ID may be in a form selected from the group consisting of: a barcode, a pin number, and a QR code. The method may further comprise the service provider processing unit then performing the steps of: (f) receiving confirmation that the consumer has presented the token ID and the payment to the POS terminal; (g) displaying a transaction receipt on the transaction-specific web page; (h) notifying the merchant that the consumer has provided the payment; and/or (i) selecting the form of the token ID based on the POS terminal selected by the consumer.

In still another embodiment, there is provided a method for facilitating a cash payment for goods/services, wherein the consumer provides the payment at a POS terminal. The method comprises a service provider processing unit performing the steps of: (a) obtaining a consumer's contact information; (b) creating a transaction-specific URL linked to a transaction-specific web page for displaying the one or more transaction instructions; and (c) sending the transaction-specific URL to the consumer. Whereupon the consumer clicks the transaction-specific URL on a mobile device, the service provider processing unit performs the step of: (d) displaying the one or more transaction instructions on the transaction-specific web page. Whereupon the consumer indicates they are present at the POS terminal, the service provider processing unit performs the step of: (e) displaying a token ID on the transaction-specific web page, wherein the token ID is used to initiate data communication between the POS terminal and the service provider processing unit. The token ID may be in a form selected from the group consisting of: a barcode, a pin number, and a QR code. The method may further comprise the service provider processing unit then performing the steps of: (f) receiving an amount of payment received at the POS terminal; (g) displaying a transaction receipt on the transaction-specific web page; and/or (h) crediting a consumer account, debit card, pre-paid card, loan, or equivalent account, based on the amount of payment received at the POS terminal.

In yet another embodiment, there is provide a system and method for facilitating a cash payment for goods or services, wherein a consumer provides the payment at a POS terminal. The system and method include a service provider processing unit performing the steps of: (a) creating a transaction-specific display prompt for displaying the one or more transaction instructions; (b) sending the consumer a transaction-specific link to the transaction-specific display prompt; (c) displaying the one or more transaction instructions on the transaction-specific display prompt; and (d) displaying a token ID on the transaction-specific display prompt, wherein the token ID is used to initiate data communication between the POS terminal and the service provider processing unit. The system and method may further include the service provider processing unit performing the steps of: (e) receiving an amount of payment received at the POS terminal; (f) displaying a transaction receipt on the transaction-specific display prompt; (g) crediting a consumer account, debit card, pre-paid card, or loan, based on the amount of payment received at the POS terminal. The system and method presented can be implemented on a browser-based mobile prompt, or an application specific display interface.

Communication Between Parties Practicing the Present Invention.

In one embodiment, communication between the various parties and components of the present invention is accomplished over a network consisting of electronic devices connected either physically or wirelessly, wherein digital information is transmitted from one device to another. Such devices (e.g., end-user devices and/or servers) may include, but are not limited to: a desktop computer, a laptop computer, a handheld device or PDA, a cellular telephone, a set top box, an Internet appliance, an Internet TV system, a mobile device or tablet, or systems equivalent thereto. Exemplary networks include a Local Area Network, a Wide Area Network, an organizational intranet, the Internet, or networks equivalent thereto. The functionality and system components of an exemplary computer and network are further explained in conjunction with FIG. 4, below.

Computer Implementation.

Figure 4:
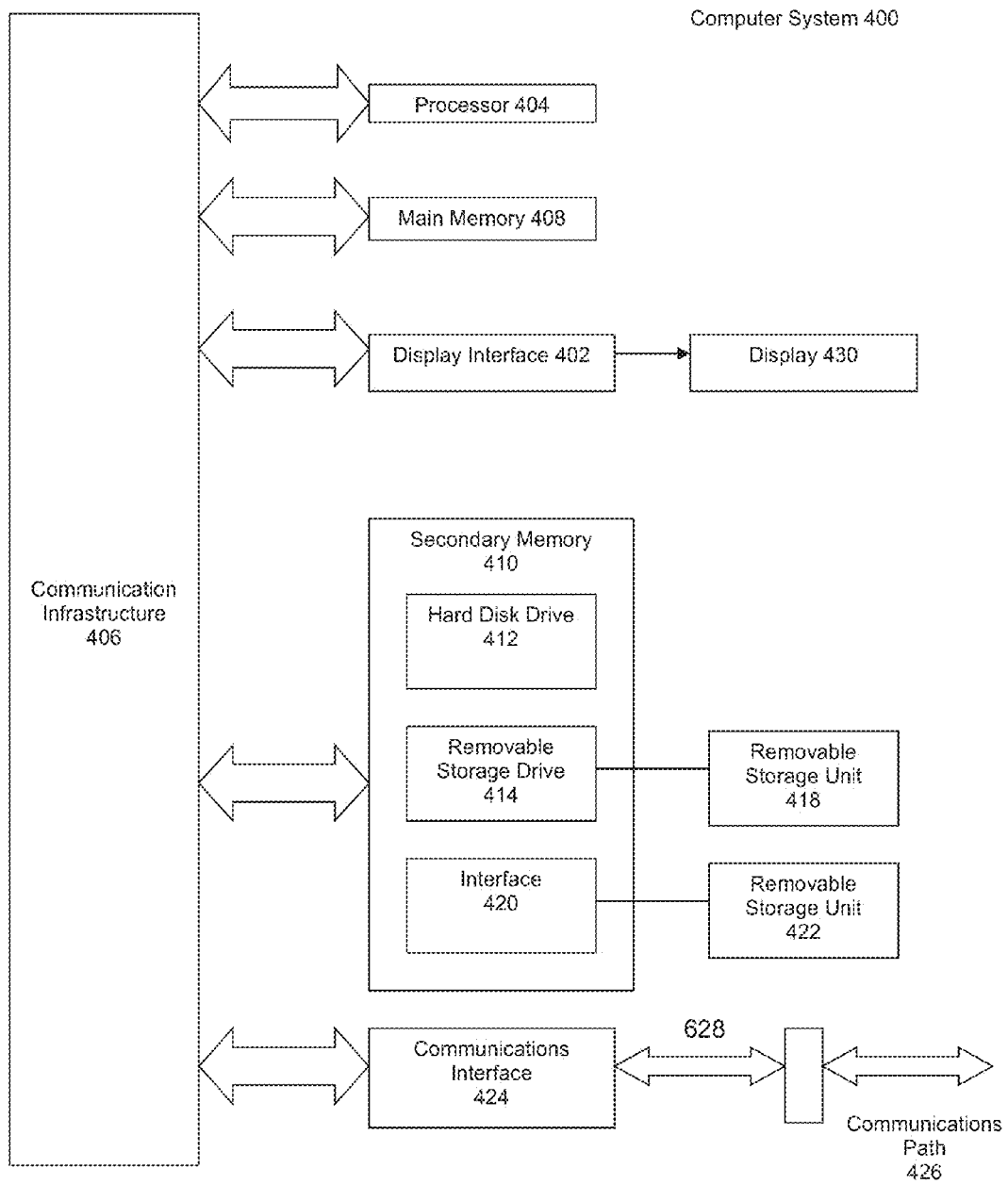
FIG. 4 is a schematic drawing of a computer system used to implement the methods presented.

In one embodiment, the invention is directed toward one or more computer systems capable of carrying out the functionality described herein. For example, FIG. 4 is a schematic drawing of a computer system 400 used to implement the methods presented above. Computer system 400 includes one or more processors, such as processor 404. The processor 404 is connected to a communication infrastructure 406 (e.g., a communications bus, cross-over bar, or network). Computer system 400 can include a display interface 402 that forwards graphics, text, and other data from the communication infrastructure 406 (or from a frame buffer not shown) for display on a local or remote display unit 430.

Computer system 400 also includes a main memory 408, such as random access memory (RAM), solid state device, and/or hard drive. Computer system 400 may also include a secondary memory 410. The secondary memory 410 may include, for example, a hard disk drive 412 and/or a removable storage drive 414, representing a floppy disk drive, a magnetic tape drive, an optical disk drive, flash memory device, universal serial bus (USB) device, etc. The removable storage drive 414 reads from and/or writes to a removable storage unit 418. Removable storage unit 418 represents a floppy disk, magnetic tape, optical disk, flash memory device, universal serial bus (USB) device, etc., which is read by and written to by removable storage drive 414. As will be appreciated, the removable storage unit 418 includes a computer usable storage medium having stored therein computer software, instructions, and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow computer software, instructions, and/or data to be transferred from the removable storage unit 422 to computer system 400.

Computer system 400 may also include a communications interface 424. Communications interface 424 allows computer software, instructions, and/or data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to all non-transitory computer-readable media; such as removable storage drive 414, removable storage units 418, 422, a hard disk installed in hard disk drive 412, or equivalent computer-readable media with the exclusion of propagating signals. These computer program products provide computer software, instructions, and/or data to computer system 400. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the presented methods. Accordingly, such computer programs represent controllers of the computer system 400. Where appropriate, the processor 404, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 400 using removable storage drive 414, interface 420, hard drive 412, communications interface 424, or equivalents thereof. The control logic (software), when executed by the processor 404, causes the processor 404 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

Embodiments of the invention, including any systems and methods described herein, may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium for facilitating a payment for goods or services between an online merchant and a consumer. The computer-readable storage medium includes instructions executable by at least one processing device that, when executed, cause the processing device to: (a) receive a purchase request from the online merchant's web-based interface; (b) stage a transaction in a database by creating a database entry linking one or more transaction instructions to the consumer; (c) create a transaction-specific URL linked to a transaction-specific web page for displaying the one or more transaction instructions; (d) provide the consumer with a web-based prompt to enter their contact information; (e) receive the consumer's contact information and linking the contact information to the database entry; and (f) use the provided contact information to send the transaction-specific URL to the consumer. Whereupon the consumer clicks the transaction-specific URL on a mobile device, the computer-readable storage medium includes instructions that cause the processing device to: (g) receive a user-agent string identifying the mobile device; (h) assess the compatibility of the mobile device based on the user-agent string; (i) receive a geolocation from the mobile device; (j) identify one or more POS terminals local to the consumer based on geolocation; and (k) provide the consumer, via the transaction-specific web page, a list of the one or more POS terminals. Whereupon the consumer selects of a POS terminal for providing the payment, the computer-readable storage medium includes instructions that cause the processing device to: (1) display a token ID on the transaction-specific web page, wherein the token ID is linked to the database entry and is used to initiate data communication between the consumer-selected POS terminal and the service provider processing unit; (m) provide the consumer-selected POS terminal with a communication interface such that the consumer-selected POS terminal can confirm that the consumer has presented the token ID and provided the payment to the POS terminal; (n) receive confirmation that the consumer has presented the token ID and the payment to the POS terminal; (o) verify that the payment is in accordance with the one or more transaction instructions; (p) display a transaction receipt on the transaction-specific web page; (q) notifying the merchant that the consumer has provided the payment; and/or (r) select the form of the token ID based on the POS terminal selected by the consumer. The token ID may be a form selected from the group consisting of: a barcode, a pin number, and a QR code. The purchase request may be received from the web-based interface based on directives from a merchant server. The purchase request may be received via an application programming interface (API) call from a merchant server. The consumer may provide their contact information in the form of an e-mail address or a telephone number. The transaction-specific URL may be sent to the consumer in an e-mail or a SMS text message.

In another embodiment, there is provided a computer-readable storage medium for facilitating a transaction between a merchant and a consumer, wherein the consumer provides a payment for the transaction at a consumer-selected point-of-sale (POS) terminal. The computer-readable storage medium includes instructions executable by at least one processing device that, when executed, cause the processing device to: (a) receive a service request; (b) stage a transaction in a database by creating a database entry linking one or more transaction instructions to the consumer; (c) create a transaction-specific URL linked to a transaction-specific web page for displaying the one or more transaction instructions; and (d) use consumer contact information to send the transaction-specific URL to the consumer. Whereupon the consumer accesses the transaction specific web page from a mobile device, via the transaction-specific URL, the computer-readable storage medium includes instructions that cause the processing device to: (e) identify one or more available POS terminals; and (f) display the one or more available POS terminals on the transaction-specific web page. Whereupon the consumer selects a POS terminal for providing the payment, the computer-readable storage medium includes instructions that cause the processing device to: (g) display a token ID on the transaction-specific web page, wherein the token ID is linked to the database entry and is used to initiate data communication between the consumer-selected POS terminal and the service provider processing unit; (h) receive confirmation that the consumer has presented the token ID and the payment to the POS terminal; (i) display a transaction receipt on the transaction-specific web page; and/or (j) notifying the merchant that the consumer has provided the payment. The token ID may be in a form selected from the group consisting of: a barcode, a pin number, and a QR code.

In another embodiment, there is provided a computer-readable storage medium for facilitating a payment between a merchant and a consumer, wherein the consumer provides the payment at a consumer-selected point-of-sale (POS) terminal. The computer-readable storage medium includes instructions executable by at least one processing device that, when executed, cause the processing device to: (a) stage a transaction in a database by creating a database entry linking one or more transaction instructions to the consumer; (b) create a transaction-specific unique reference locator (URL) linked to a transaction-specific web page for displaying the one or more transaction instructions; and (c) send the transaction-specific URL to the consumer via a short message service (SMS) text message. Whereupon the consumer clicking the transaction-specific URL on a mobile device, the computer-readable storage medium includes instructions that cause the processing device to: (d) display the one or more transaction instructions on the transaction-specific web page; and (e) display a token ID on the transaction-specific web page, wherein the token ID is linked to the database entry and is used to initiate data communication between the consumer-selected POS terminal and the service provider processing unit. The computer-readable storage medium may further include instructions that cause the processing device to: (f) receive confirmation that the consumer has presented the token ID and the payment to the POS terminal; (g) display a transaction receipt on the transaction-specific web page; (h) notify the merchant that the consumer has provided the payment; and/or (i) select the form of the token ID based on the POS terminal selected by the consumer. The token ID may be in a form selected from the group consisting of: a barcode, a pin number, and a quick response (QR) code.

In still another embodiment, there is provided a computer-readable storage medium for facilitating a cash payment by a consumer, wherein the consumer provides the payment at a consumer-selected point-of-sale (POS) terminal. The computer-readable storage medium includes instructions executable by at least one processing device that, when executed, cause the processing device to: (a) obtain a consumer's contact information; (b) create a transaction-specific URL linked to a transaction-specific web page for displaying the one or more transaction instructions; (c) send the transaction-specific URL to the consumer; (d) display the one or more transaction instructions on the transaction-specific web page; (e) display a token ID on the transaction-specific web page, wherein the token ID is used to initiate data communication between the POS terminal and the service provider processing unit; (f) receive an amount of payment received at the POS terminal; (g) display a transaction receipt on the transaction-specific web page; and/or (h) credit a consumer account, debit card, pre-paid card, loan, or equivalent account, based on the amount of payment received at the POS terminal.

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible. Further, each system component and/or method step presented should be considered a "means for" or "step for" performing the function described for said system component and/or method step. As such, any claim language directed to a "means for" or "step for" performing a recited function refers to the system component and/or method step in the specification that performs the recited function, as well as equivalents thereof.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A method for facilitating a payment between an online merchant and a consumer, wherein the consumer provides a purchase request on a mobile device, and wherein the consumer provides the payment for the purchase request at a point-of-sale terminal that is local to the consumer and remote to the merchant, the method comprising:
   receiving with a communications interface of a service provider system the purchase request made on the mobile device;
   generating with a processor of the service provider system transaction instructions for the purchase request;
   receiving with the communications interface of the service provider system the consumer's mobile phone number;
   linking with the processor of the service provider system the consumer's mobile phone number to the transaction instructions;
   creating with the processor of the service provider system a transaction-specific unique reference locator linked to a transaction-specific web page;
   updating with the processor of the service provider system the transaction-specific web page to display instructions to the consumer on how to provide the payment for the purchase request at the point-of-sale terminal;
   transmitting with the communications interface of the service provider system the transaction-specific unique reference locator to the consumer at the consumer's mobile telephone number;
   generating with the processor of the service provider system a token ID;
   linking with the processor of the service provider system the token ID to the transaction instructions;
   updating with the processor of the service provider system the transaction-specific web page to display the token ID;
   receiving with the communications interface of the service provider system confirmation that the consumer presented the token ID and the payment to the point-of-sale terminal;
   verifying with the processor of the service provider system that the payment is in accordance with the transaction instructions; and
   updating with the processor of the service provider system the transaction-specific web page to display a transaction receipt confirming the payment at the point-of-sale.

2. The method of claim 1, further comprising notifying with the communications interface of the service provider system the merchant that the consumer has provided the payment.

3. The method of claim 1, wherein the token ID is in a form selected from the group consisting of: a barcode, a pin number, and a quick response (QR) code.

4. The method of claim 3, further comprising selecting with the processor of the service provider system the form of the token ID based on the point-of-sale terminal.

5. The method of claim 1, further comprising:
   receiving with the communications interface of the service provider system geolocation information from the mobile device;
   identifying with the processor of the service provider system the point-of-sale based on the geolocation information; and
   updating with the processor of the service provider system the transaction-specific web page to display the address of the point-of-sale.

6. The method of claim 5, wherein the token ID is in a form selected from the group consisting of: a barcode, a pin number, and a quick response (QR) code.

7. The method of claim 6, further comprising selecting with the processor of the service provider system the form of the token ID based on the point-of-sale terminal.

8. A method for facilitating a payment between an online merchant and a consumer, wherein the consumer provides a purchase request on a mobile device, and wherein the consumer provides the payment for the purchase request at a point-of-sale terminal that is local to the consumer and remote to the merchant, the method comprising:

receiving with a communications interface of a service provider system the purchase request made on the mobile device;

generating with a processor of the service provider system transaction instructions for the purchase request;

receiving with the communications interface of the service provider system the consumer's contact information;

linking with the processor of the service provider system the consumer's contact information to the transaction instructions;

creating with the processor of the service provider system a transaction-specific unique reference locator linked to a transaction-specific web page;

updating with the processor of the service provider system the transaction-specific web page to display instructions to the consumer on how to provide the payment for the purchase request at the point-of-sale terminal;

transmitting with the communications interface of the service provider system the transaction-specific unique reference locator to the consumer at the consumer's contact information;

generating with the processor of the service provider system a token ID;

linking with the processor of the service provider system the token ID to the transaction instructions;

updating with the processor of the service provider system the transaction-specific web page to display the token ID;

receiving with the communications interface of the service provider system confirmation that the consumer presented the token ID and the payment to the point-of-sale terminal;

verifying with the processor of the service provider system that the payment is in accordance with the transaction instructions; and updating with the processor of the service provider system the transaction-specific web page to display a transaction receipt confirming the payment at the point-of-sale.

9. The method of claim 8, further comprising notifying with the communications interface of the service provider system the merchant that the consumer has provided the payment.

10. The method of claim 8, wherein the token ID is in a form selected from the group consisting of: a barcode, a pin number, and a quick response (QR) code.

11. The method of claim 10, further comprising selecting with the processor of the service provider system the form of the token ID based on the point-of-sale terminal.

12. The method of claim 8, further comprising:

receiving with the communications interface of the service provider system geolocation information from the mobile device;

identifying with the processor of the service provider system the point-of-sale based on the geolocation information; and updating with the processor of the service provider system the transaction-specific web page to display the address of the point-of-sale.

13. The method of claim 12, wherein the token ID is in a form selected from the group consisting of: a barcode, a pin number, and a quick response (QR) code.

14. The method of claim 13, further comprising selecting with the processor of the service provider system the form of the token ID based on the point-of-sale terminal.

\* \* \* \* \*